United States Patent [19]
Ko et al.

[11] Patent Number: 5,663,910
[45] Date of Patent: Sep. 2, 1997

[54] INTERLEAVING ARCHITECTURE AND METHOD FOR A HIGH DENSITY FIFO

[75] Inventors: Ray-Jane Ko, Saratoga; Fu Lam Au, Fremont; Joseph P. Chiang, Cupertino, all of Calif.

[73] Assignee: Integrated Device Technology, Inc., Santa Clara, Calif.

[21] Appl. No.: 581,703

[22] Filed: Dec. 29, 1995

Related U.S. Application Data

[62] Division of Ser. No. 279,091, Jul. 22, 1994, abandoned.

[51] Int. Cl.$^6$ .................................................. G11C 13/00
[52] U.S. Cl. .............................. 365/189.05; 365/189.04
[58] Field of Search ........................... 365/189.04, 189.05

[56] References Cited

U.S. PATENT DOCUMENTS 5,596,533  1/1997  Park ...................................... 365/189.04

Primary Examiner—Terrell W. Fears
Attorney, Agent, or Firm—Skjerven, Morrill, MacPherson, Franklin & Friel

[57] ABSTRACT

A plurality of parallel single port memory arrays are coupled between a corresponding plurality of input FIFO sets and a corresponding plurality of output FIFO sets to create a high-speed FIFO memory device. The input FIFO sets, which provide data values to their corresponding single port memory arrays, are responsive to a write clock signal. The output FIFO sets, which receive data values from their corresponding single port memory arrays, are responsive to a read clock signal. The order of read and write operations within each single port memory array is controlled by a corresponding state machine which is coupled to either the write clock signal or the read clock signal. Each of the parallel single port memory arrays operates independently. The input FIFO sets de-interleave an input data stream into a plurality of intermediate data streams. Each intermediate data stream is routed through a single port memory array to an output FIFO set. The intermediate data streams are interleaved and transmitted to an output port. In one embodiment, the high-speed FIFO memory device has the capability to retransmit previously transmitted information.

9 Claims, 32 Drawing Sheets

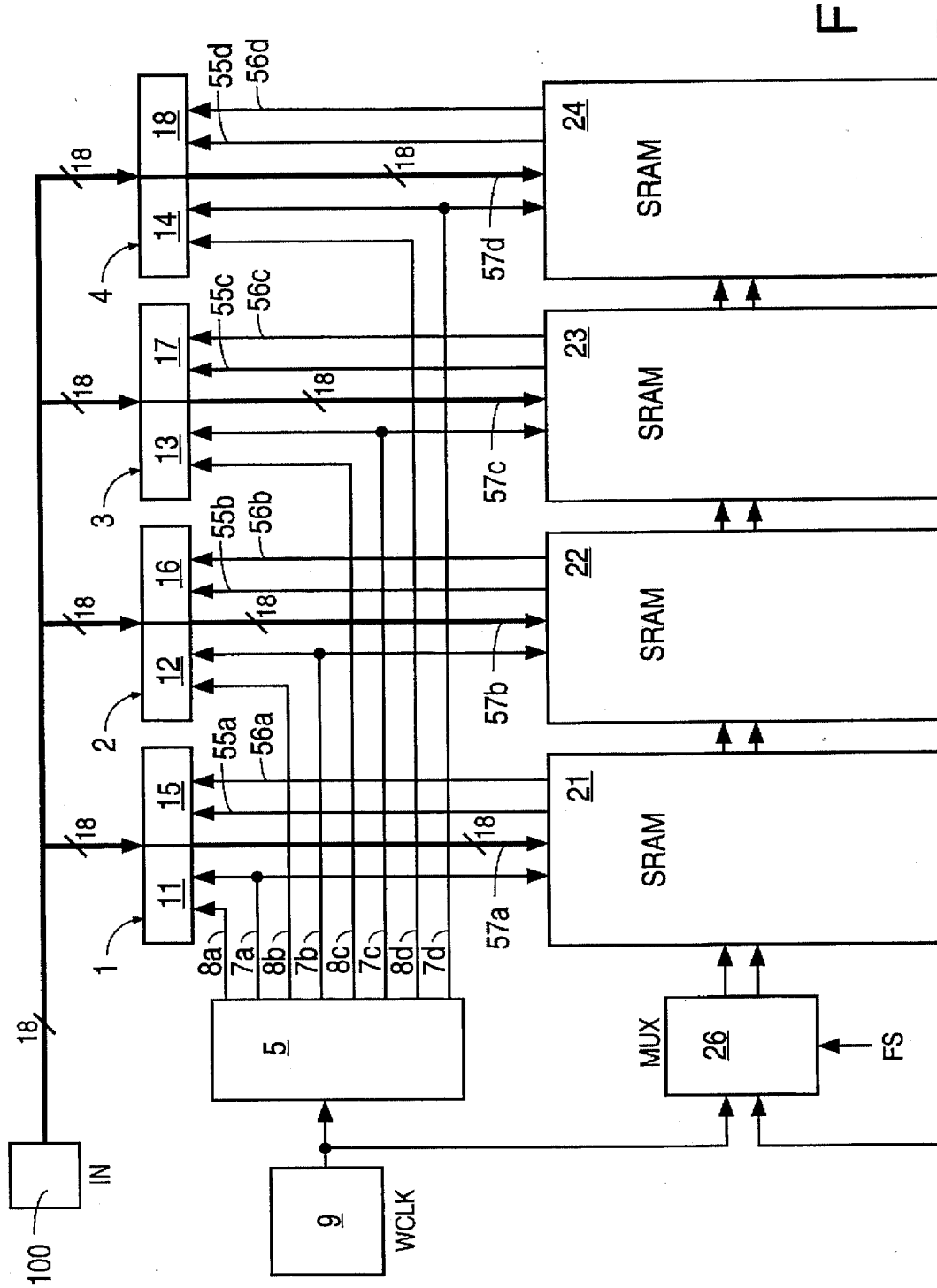

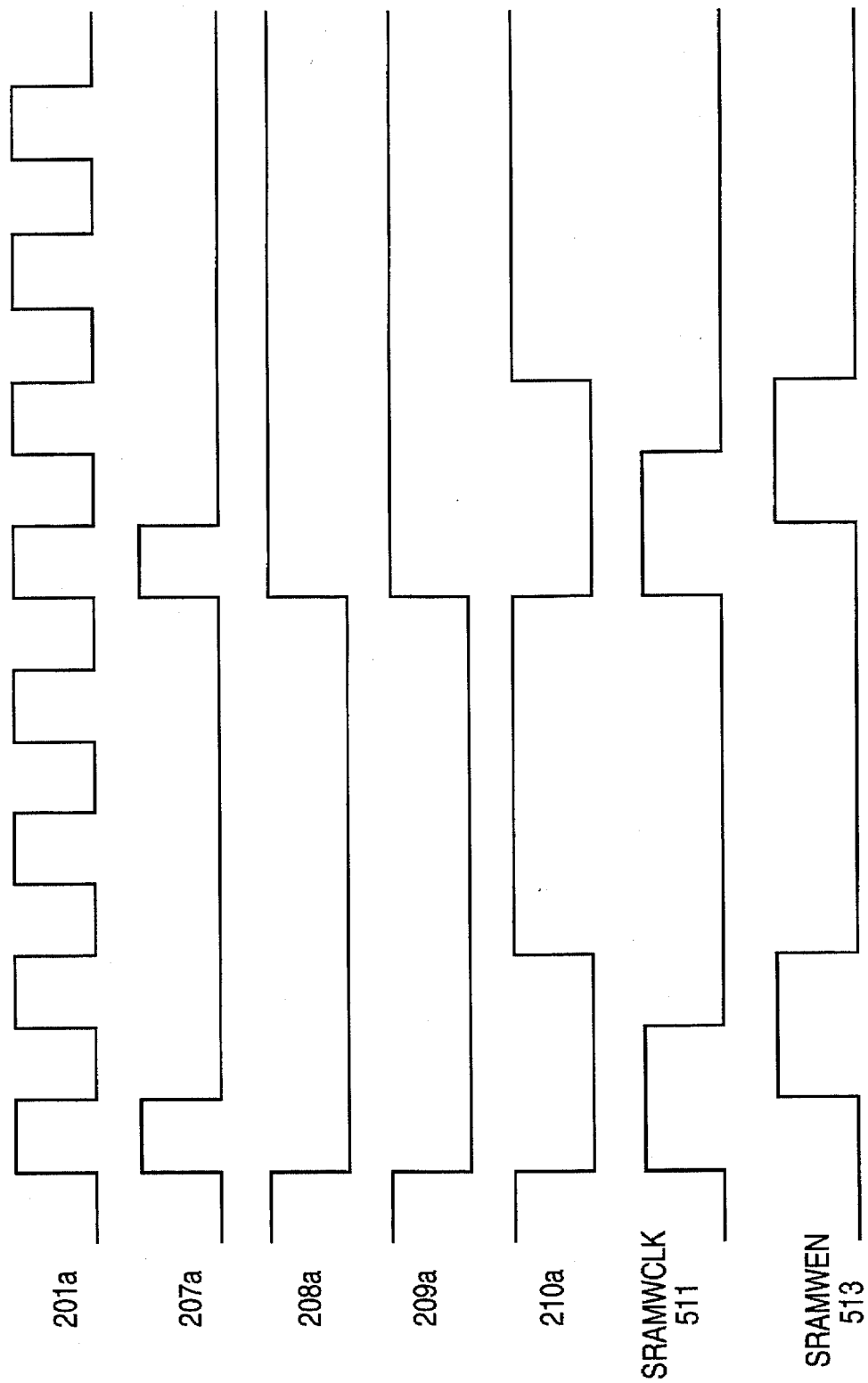

INPUT/OUTPUT STATUS:

A: WA or WE or WG          B: WB or WH
C: WC or WD or WF          D: RA or RC or RD or RE
E: RB or RG                F: RF or RH or RI
G: NRA or NRD or NRH       I: NRI or NRJ
H: NRB or NRC or NRE or NRF or NRG
J: NRA or NRD or NRH       L: NRI or NRJ
K: NRB or NRC or NRE or NRF or NRG
M: SW                      N: SW
O: SR                      P: SR

| FIG. 18a-1 | FIG. 18a-2 | FIG. 18a-3 |
|---|---|---|
| FIG. 18a-4 | FIG. 18a-5 | FIG. 18a-6 | input:
-------- present state: ps2ps1ps0
a: ps2     d: fs           g: sram empty
b: ps1     e: infifo empty  h: outfifo empty
c: ps0     f: infifo full   i: outfifo full output:
--------- next state: s2s1s0
f0: sramwclk
f1: wreq
f2: sramrclk
f3: rreq
f4: rstrobe

===================================================

$$s2 = \overline{a}\,c\,\overline{d}\,\overline{f}\,\overline{g}\,\overline{i} + abc\overline{g}hi + abce\overline{g}\,\overline{i} + \overline{a}\,\overline{c}\,\overline{g}hi + \overline{a}\,ce\overline{g}\,\overline{i} + a\,b\,f\,i + a\,\overline{b}c$$
$$= \overline{a}\,c\,\overline{d}\,\overline{f}\,\overline{g}\,\overline{i} + abc\overline{g}\,\overline{i}(h+e) + \overline{a}\,c\,\overline{g}\,\overline{i}(h+e) + a\,b\,(f\,i+\overline{c})$$

$$s1 = ab\overline{c}\,\overline{d}\overline{e}\,\overline{h} + \overline{a}\,\overline{b}c\overline{g}hi + abc\overline{e}\,\overline{h} + \overline{a}\,\overline{c}\,e\overline{f}\overline{h} + \overline{a}\,\overline{b}ce + abci + abc\overline{g}$$
$$\quad + \overline{a}\,\overline{c}\,i + \overline{a}\,\overline{c}\,g$$
$$= \overline{a}\,\overline{c}\,e\,\overline{h}\,(\overline{b}d+\overline{f}) + \overline{a}\,\overline{b}c\,(\overline{g}hi+e) + abc\,(\overline{e}\,\overline{h}+i+\overline{g}) + \overline{a}\,\overline{c}\,(i+g)$$

$$s0 = \overline{b}c\overline{d}\overline{e}\,\overline{h} + \overline{a}\overline{b}\overline{e}\,\overline{h} + \overline{c}\,e\overline{f}\overline{h} + \overline{a}\,bc\overline{h} + \overline{a}\,bci + \overline{b}\overline{c}\,\overline{e}i + ab\overline{e}g + ab\overline{e}i$$
$$\quad + \overline{a}\,bg + \overline{c}\,eg + a\overline{c} + \overline{c}\overline{d}ei$$
$$= \overline{c}\,\overline{e}\,\overline{h}\,(\overline{b}d+\overline{f}) + \overline{a}\,bc\,(\overline{h}+i) + \overline{c}\,ei\,(\overline{b}+\overline{d}) + ab\overline{e}\,(\overline{h}+g+i) + (\overline{a}\,bg+\overline{c}\,eg+a\overline{c})$$

$$f0 = abc\overline{d}\overline{e}\,\overline{h} + \overline{a}\,\overline{b}c\overline{e}\,\overline{h} + ab\overline{c}\overline{e}\,\overline{h} + \overline{a}\,\overline{c}\,e\overline{f}\overline{h} + ab\overline{c}\,ei + abceg$$
$$\quad + abcei + a\overline{b}\,eg + \overline{a}\,c\,eg + \overline{a}\,bd\,ei$$
$$= \overline{a}\,\overline{e}\,\overline{h}\,(\overline{b}cd+bc+c\overline{f}) + abce\,(\overline{h}+g+i) + \overline{a}\,c\,e\,(\overline{b}i+g) + a\,\overline{b}\,e\,(g+di)$$

$$f1 = \overline{a}b\overline{d}\overline{e}\,\overline{h} + \overline{a}\,e\overline{f}\overline{h} + ade\overline{i} + ab\overline{e}i + \overline{a}bc + ab\overline{c} + \overline{c}\,e\,\overline{h} + \overline{a}\,eg + \overline{c}eg + \overline{c}ei$$
$$= \overline{a}\,e\,\overline{h}\,(\overline{b}d+\overline{f}) + a\,e\overline{i}\,(d+\overline{b}) + c\,(\overline{a}b+a\overline{b}) + \overline{c}e\,(\overline{h}+i) + eg\,(\overline{a}+\overline{c})$$

$$f2 = \overline{a}\,\overline{c}\,\overline{d}\,\overline{f}\,\overline{g}\,\overline{i} + abc\overline{g}hi + abce\overline{g}\,\overline{i} + \overline{a}\,\overline{b}\,\overline{c}\,f\,i + \overline{a}\,\overline{b}\,\overline{g}hi + \overline{a}\,\overline{c}\,\overline{g}hi$$
$$\quad + \overline{a}\,c\,e\overline{g}\,\overline{i}$$
$$= \overline{a}\,\overline{c}\,\overline{d}\,\overline{f}\,\overline{g}\,\overline{i} + abc\overline{g}\,\overline{i}(h+e) + \overline{a}\,\overline{b}\,i\,(\overline{c}\,f+\overline{g}h) + \overline{a}\,\overline{c}\,\overline{g}\,\overline{i}(h+e)$$

$$f3 = \overline{c}\,\overline{d}\,\overline{f}\,\overline{g}\,\overline{i} + \overline{a}\,\overline{b}\,\overline{g}h\,\overline{i} + \overline{a}bghi + \overline{a}be\overline{g}\,\overline{i} + b\,\overline{c}\,f\,i + \overline{c}\,ghi + c\,eg\,\overline{i} + a\overline{c}$$
$$= \overline{c}\,f\,i\,(\overline{d}\,\overline{g}+b) + ghi(\overline{a}\,\overline{b}+ab+\overline{c}) + eg\,\overline{i}\,(\overline{a}b+c) + a\overline{c}$$

$$f4 = \overline{a}\,\overline{b}c$$

FIG. 18b

INTERLEAVING ARCHITECTURE AND METHOD FOR A HIGH DENSITY FIFO

This application is a division of application Ser. No. 08/279,091, filed Jul. 22, 1994, now abandoned.

FIELD OF THE INVENTION

The present invention relates to a high-speed first in, first out (FIFO) memory device.

BACKGROUND OF THE INVENTION

Single port and dual port static random access memory (SRAM) devices are known in the art. Dual port SRAMs utilize two addressing systems which allow read and write operations to occur independently within the SRAM. Thus, a read operation may be performed from one address at the same time that a write operation is performed to another address. Since these read and write operations occur independently, separate read and write clocks may be utilized. These separate read and write clocks can have different frequencies, thereby allowing the dual port SRAM to act as a buffer between two systems operating at different frequencies. For example, a conventional dual port SRAM can transfer data between one system and another system at a frequency of 80 Mhz.

One disadvantage of the dual port SRAM is that the dual addressing system necessitates a large memory cell. The memory cell size of a dual port SRAM is at least twice the memory cell size of a single port SRAM having the same capacity.

While single port SRAMs use less real estate on a chip, they use a single address system. Thus, only one memory cell may be accessed at any given time. As a result, only one operation may be performed at a time. Consequently, a single port SRAM is much slower than a dual port SRAM. In addition, single port SRAMs are limited to operation from a single clock signal. This clock signal must be used to control both the read and write operations. Thus, a single port SRAM, by itself, cannot be used to buffer the transfer of data between two systems operating at different frequencies.

Furthermore, it is known that an asynchronously operating dual port SRAM is capable of retransmitting data values stored in the SRAM. During such a retransmit operation, the dual port SRAM is instructed (typically by an external system) to read out data values previously stored in the dual port SRAM, starting at an initial address. During a retransmit operation, data values which were previously read out of the dual port SRAM may again be read out of the SRAM. Such a retransmit operation is allowed because of the independent nature of the read and write operations within the dual port SRAM.

It would therefore be advantageous to have a FIFO memory device which can control read and write operations with two separate clock signals, operate with the high speed data transfer characteristics of a dual port SRAM, exhibit the reduced layout area of a single port SRAM and be capable of performing a retransmit operation.

SUMMARY OF THE INVENTION

In accordance with the present invention, a FIFO memory device is provided with a plurality of parallel memory paths coupled between an input port and an output port. Each parallel memory path has an input FIFO set coupled to the input port, an output FIFO set coupled to the output port and a single port memory array coupled between the input FIFO set and the output FIFO set. Each input FIFO set has a plurality of parallel input FIFOs and each output FIFO set has a plurality of parallel output FIFOs.

The present invention has control logic to accommodate read and write clock signals having different frequencies. The input FIFO sets, which transfer data values from the input port to the single port memory arrays, are responsive to a write clock signal. The output FIFO sets, which transfer data values from the single port memory arrays to the output port, are responsive to a read clock signal. Each single port memory array is controlled by a corresponding state machine. Each state machine is coupled to the faster of the write clock signal or the read clock signal. The input and output FIFO sets buffer the input and output data values and thereby maximize the bus bandwidth. To assist in the buffering function, each state machine controls the order of the read and write operations within its corresponding single port memory array such that overflow conditions are avoided. Each of the parallel single port memory arrays operates independently. That is, each single port memory array may perform a read or write operation at the same time that a parallel single port memory array is performing a read or write operation.

An input data stream of data values is provided through the input port to the input FIFO sets. The input FIFO sets are controlled to de-interleave the data values into a plurality of intermediate data streams. The data values of each of the intermediate data streams are written into a corresponding one of the single port memory arrays. The data values of each of the intermediate data streams are subsequently read out of the corresponding single port memory arrays and to a corresponding one of the output FIFO sets. The data values of each of the intermediate data streams are then interleaved into an output data stream such that the sequence of the data values in the input data stream is maintained in the output data stream. The order of the read and write operations within the single port memory arrays is independently controlled by the corresponding state machines within the single port memory arrays. The above described configuration and method of operation allows data to be transferred at a high rate.

The above described FIFO memory device also allows the transfer of data between asynchronous systems. Thus, the output of a faster system, such as a CPU, can be fed into a slower peripheral system, such as a graphics card, without requiring the faster system to slow down to the rate of the slower system.

Because the FIFO memory device of the present invention utilizes single port memory arrays, it requires less real estate on a chip than the prior art dual port FIFO memory devices. However, the present invention allows high-speed first in, first out operation normally associated with dual port memory devices. Furthermore, the FIFO memory device of the present invention preferably includes a retransmit function which allows data values to be retransmitted from the single port memory arrays.

The present invention will be more fully understood in light of the following drawings taken together with the detailed description.

BRIEF DESCRIPTION OF THE DRAWINGS

FIG. 18b is a table illustrating boolean functions performed by the blocks of FIG. 18a.

DETAILED DESCRIPTION

Figure 1B:
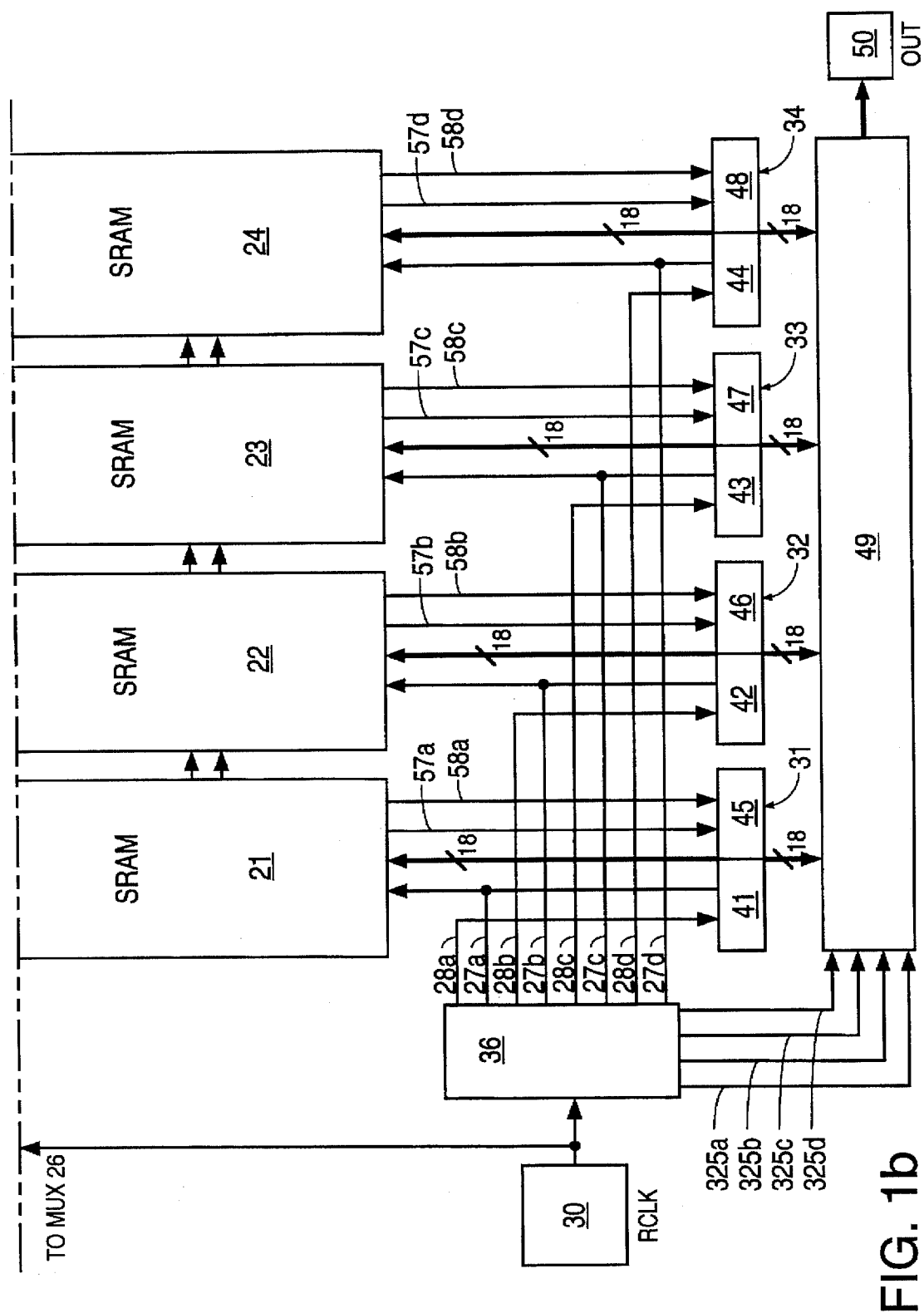
FIG. 1 is a block diagram illustrating a high-speed FIFO according to one embodiment of the present invention, wherein FIG. 1 consists of the portions illustrated in FIG. 1a and FIG. 1b.
Figures 1, 18A:
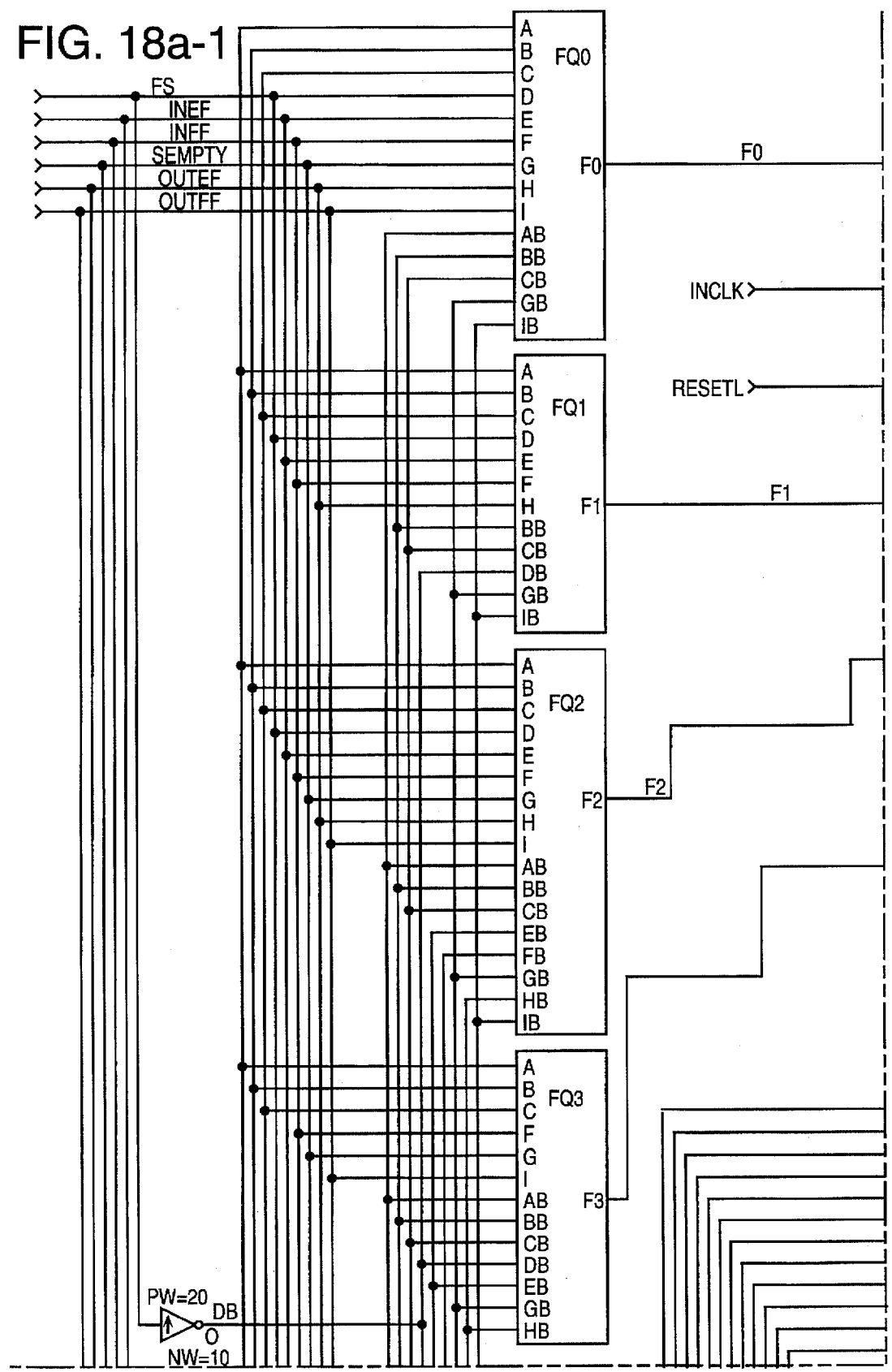
FIG. 18a is a block diagram of one embodiment of a state machine defined by Table 1.
Figures 2, 18A:
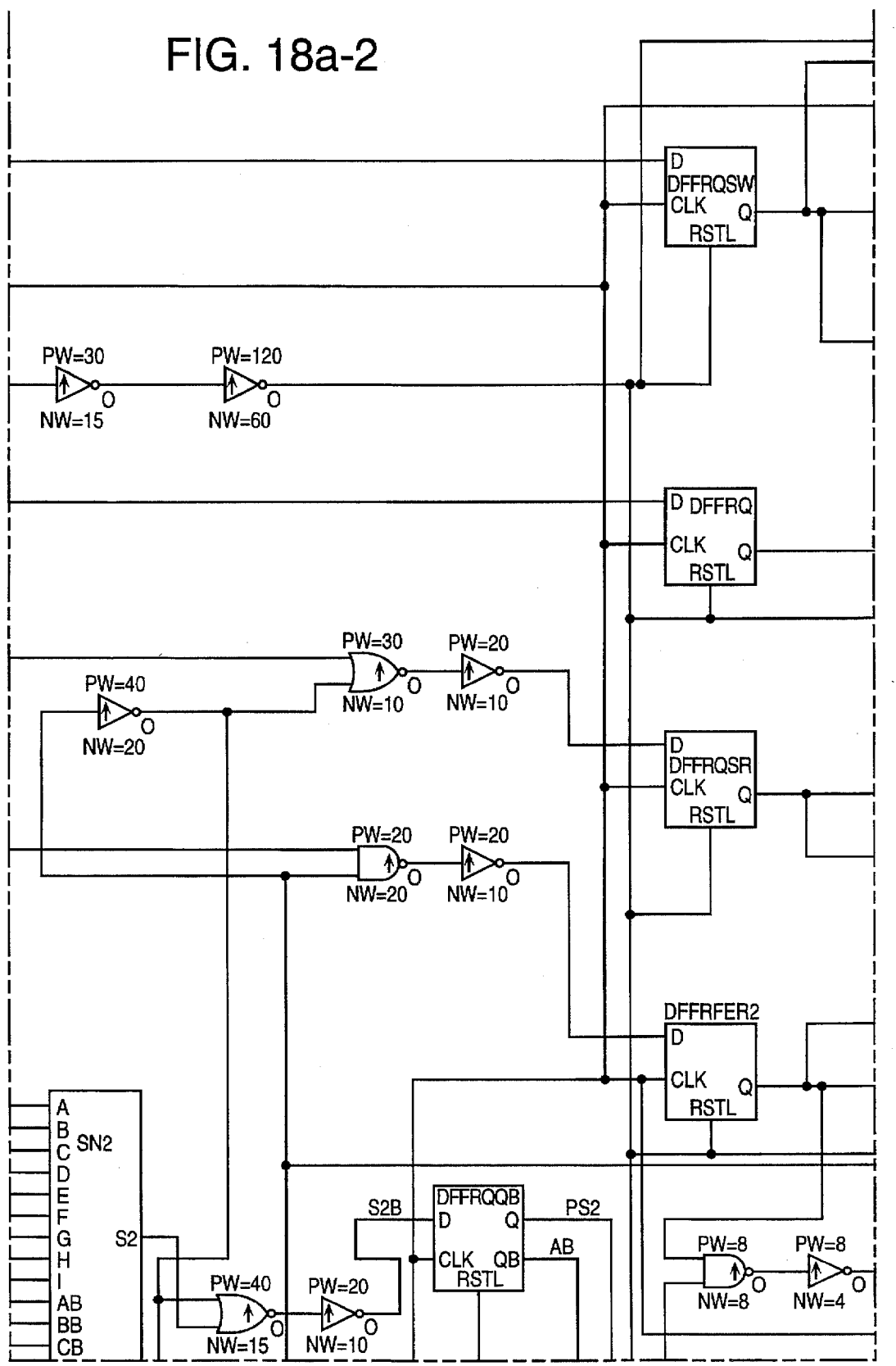

FIG. 1 is a block diagram illustrating a high-speed FIFO according to one embodiment of the present invention, wherein FIG. 1 includes the portions illustrated in FIG. 1a and FIG. 1b. Data input port 100 is connected in parallel to eight register-based first-in, first-out buffers (input FIFOs) 11–18. These input FIFOs are grouped into input FIFO pairs 1–4. Input FIFO pair 1 includes input FIFOs 11 and 15, input FIFO pair 2 includes input FIFOs 12 and 16, input FIFO pair 3 includes input FIFOs 13 and 17, and input FIFO pair 4 includes input FIFOs 14 and 18.

An input data stream from a CPU or other device is applied to input port 100. The input data stream has fixed length data values, which in the embodiment described, are 18 bits wide. However, the data values may have other number of bits in other embodiments. Input FIFO pairs 1–4 each receive the data values from the input data stream. Input FIFO pairs 1–4 also receive control signals from the write control logic block 5 and from SRAM memory blocks 21–24.

Figure 2:
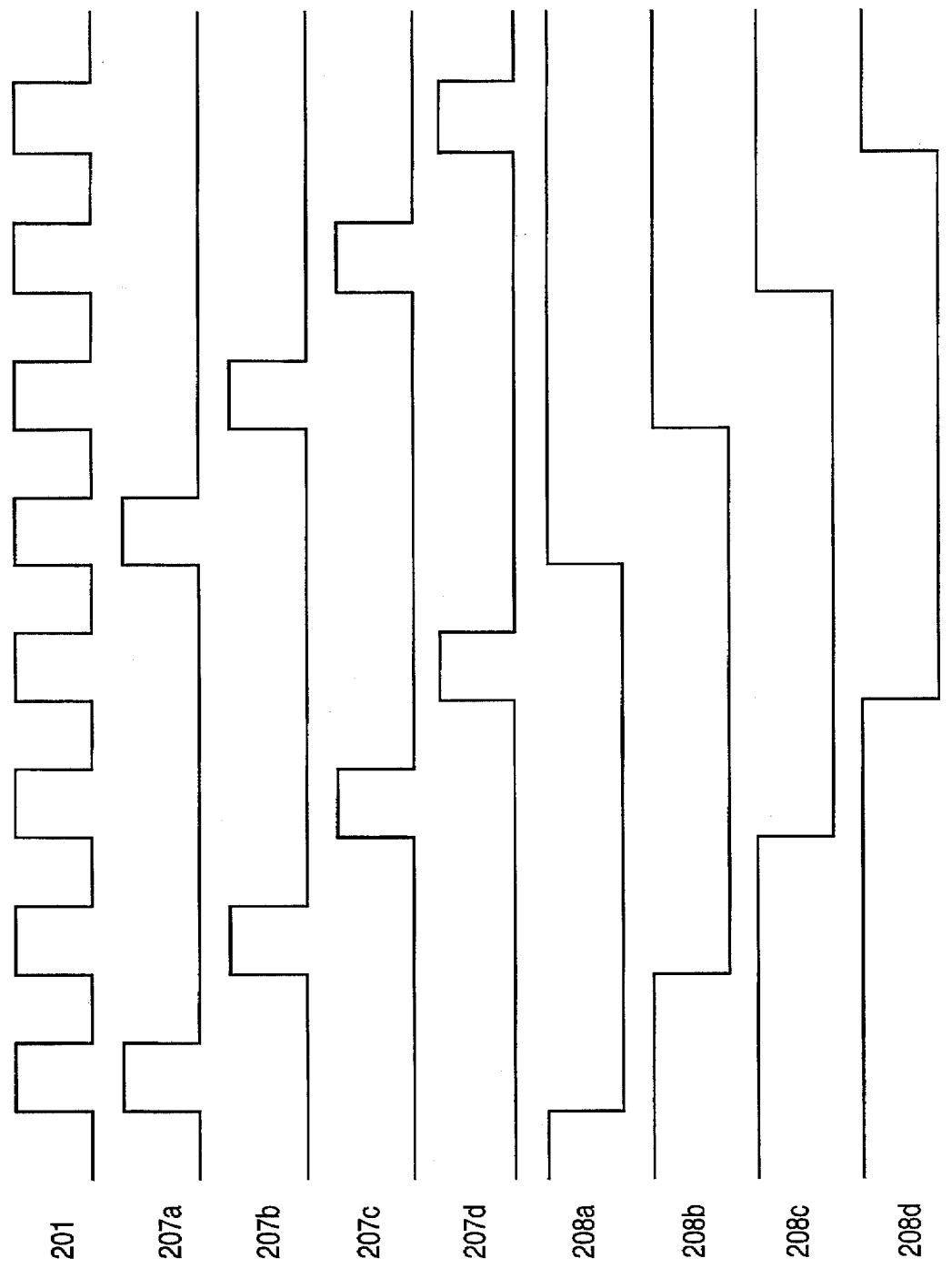
FIG. 2 is a waveform diagram illustrating a write clock signal, input FIFO write enable signals, and input FIFO write select signals.

Write control logic block 5 is coupled to write clock 9 and multiplexer 26. Write control logic block 5 receives a write clock signal (WCLK) 201 from write clock 9. In response, write control logic block 5 creates four input FIFO write enable signals 207a–207d and four input FIFO write select signals 208a–208d. FIG. 2 is a waveform diagram illustrating WCLK signal 201, input FIFO write enable signals 207a–207d and input FIFO write select signals 208a–208d. Input FIFO write enable signals 207a–207d are sent to input FIFO pairs 1–4, respectively, and SRAM memory blocks 21–24, respectively, on leads 7a–7d, respectively. Input FIFO write select signals 208a–208d are sent to input FIFO pairs 1–4, respectively, on leads 8a–8d, respectively. Input FIFO write enable signals 207a–207d are sequentially enabled once every four cycles of WCLK signal 201. Input FIFO write select signals 208a–208d change state at rising edges of input FIFO write enable signals 207a–207d, respectively. Input FIFO write enable signals 207a–207d and input FIFO write select signals 208a–208d control the order in which the data values of the input data stream are written into the input FIFOs 11–18.

For example, signals 207a and 208a cause the first data value of the input data stream to be written to input FIFO 11. Signals 207b and 208b cause the second data value to be written to input FIFO 12. Signals 207c and 208c, signals 207d and 208d, signals 207a and 208a, signals 207b and 208b, signals 207c and 208c, and signals 207d and 208d sequentially cause the third through the eighth data values to be written to input FIFOs 13, 14, 15, 16, 17 and 18, respectively. After signals 207d and 208d cause the eighth input data value to be written to input FIFO 18, the cycle starts again, with signals 207a and 208a causing the ninth input data value to be written to input FIFO 11.

Figures 3, 18A:
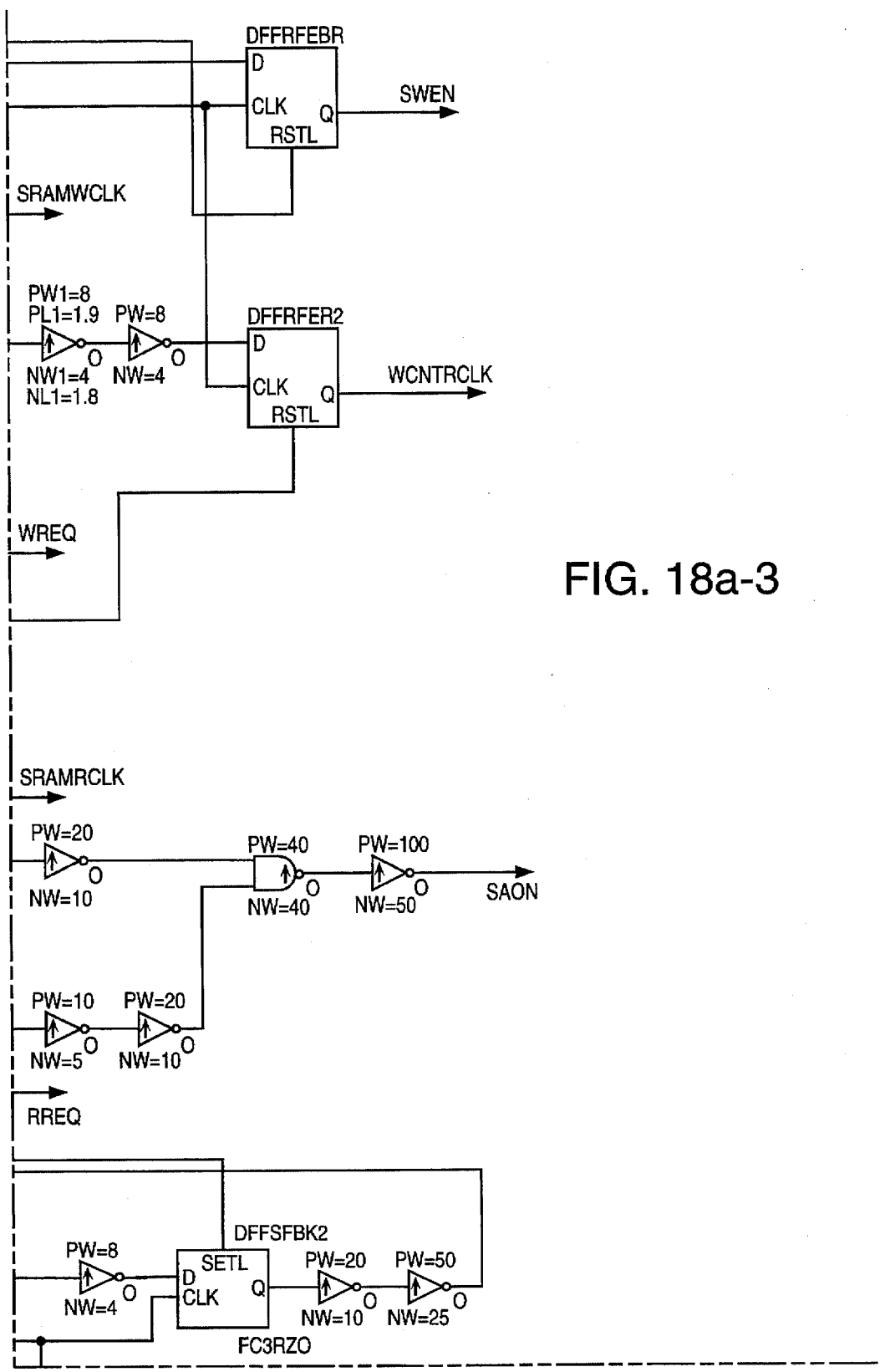
FIG. 3 is a waveform diagram illustrating signals used to control an input FIFO pair.
Figures 4, 18A:
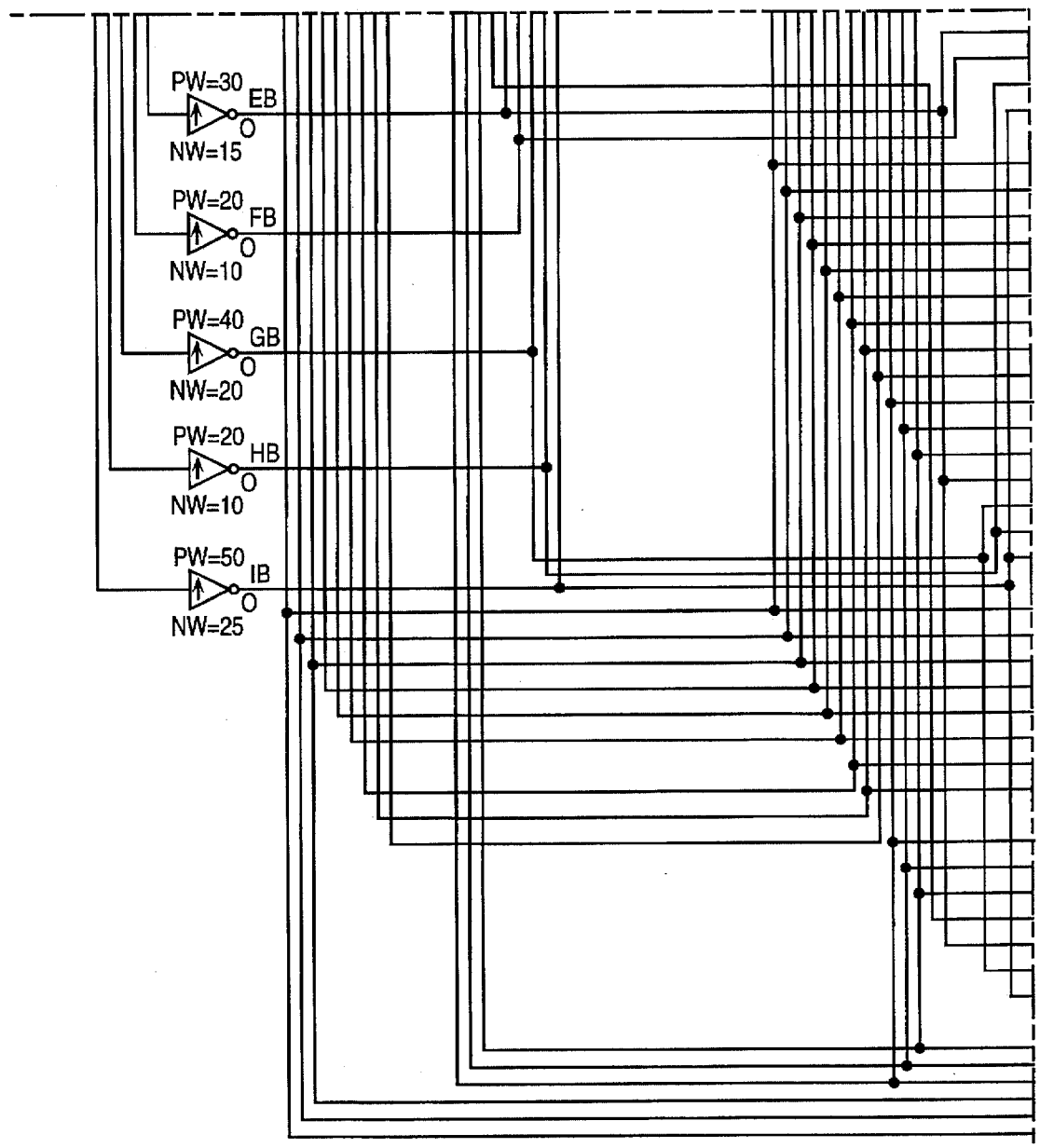
Figures 5, 18A:
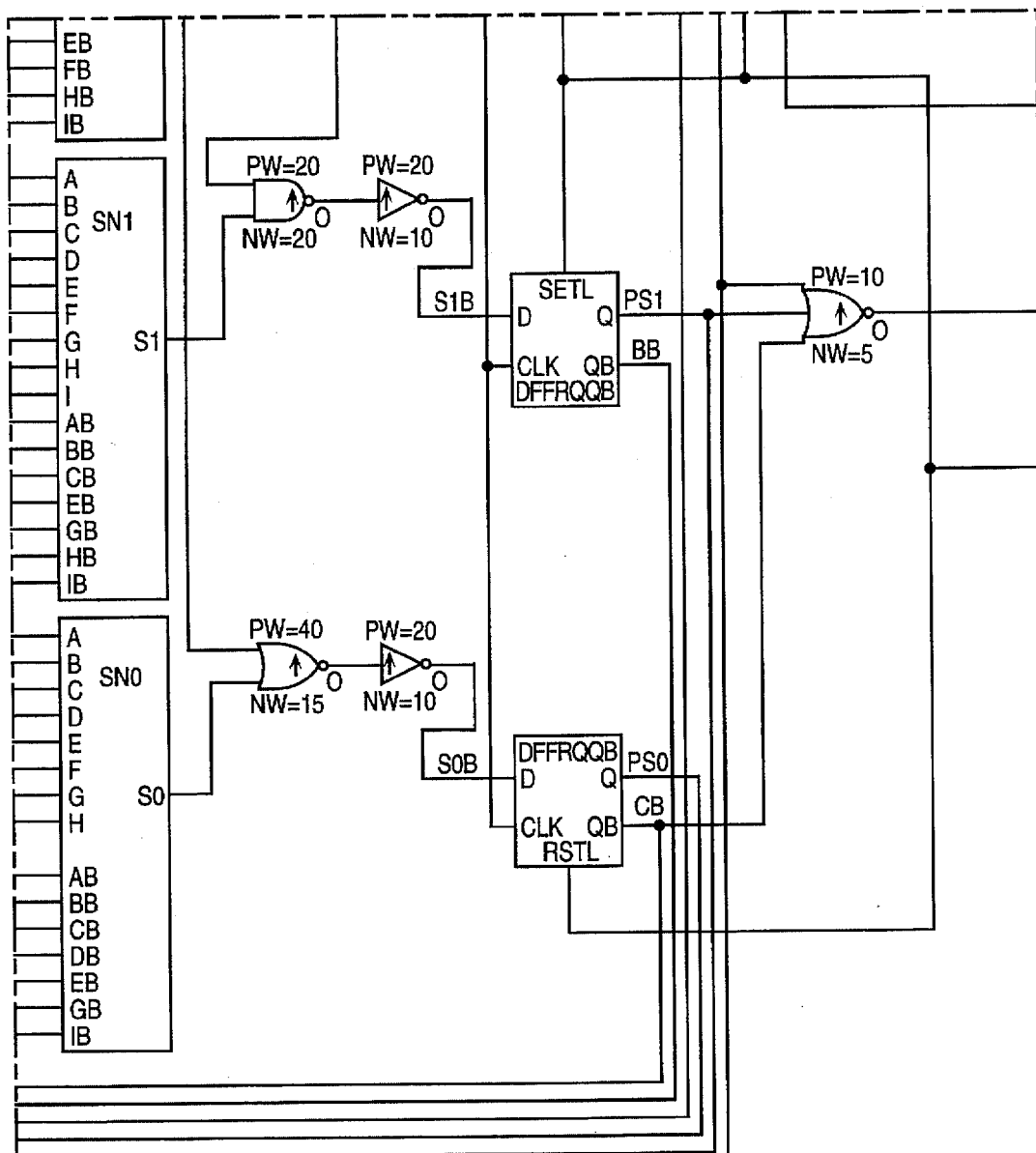
Figures 6, 18A:
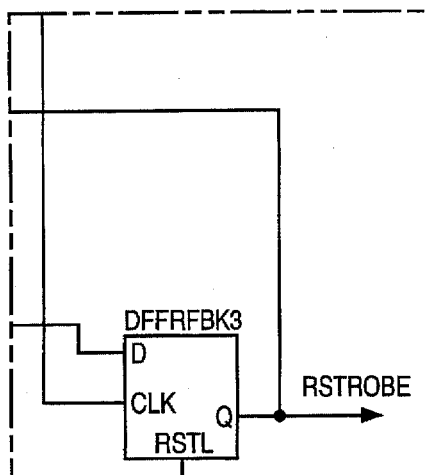

Input FIFO pairs 1–4 also each receive an input FIFO read select signal and an input FIFO read enable signal from SRAM memory blocks 21–24, respectively. Input FIFO read select signals are transmitted from SRAM memory blocks 21–24 to input FIFO pairs 1–4 on leads 55a–55d, respectively. Input FIFO read enable signals are transmitted from SRAM memory blocks 21–24 to input FIFO pairs 1–4 on leads 56a–56d, respectively. These signals enable data values to be read out from input FIFOs 11–18. The operation of input FIFOs 11–18 is now described using the input FIFO pair 1 as an example. FIG. 3 is a waveform diagram illustrating the signals used to control input FIFO pair 1, including WCLK signal 201, input FIFO write enable signal 207a, input FIFO write select signal 208a, input FIFO read select signal 209a, and input FIFO read enable signal 210a. Input FIFO read select signal 209a and input FIFO read enable signal 210a are derived from an SRAM write clock signal (SRAMWCLK) 511 and an SRAM write enable signal (SRAMWEN) 513 which are generated by a state machine 71 within SRAM memory block 21. The detailed operation of state machine 71 is described later. For now it is noted that SRAMWCLK signal 511 and SRAMWEN signal 513 are asserted each time a data value is read from input FIFOs 11 and 15 and written to SRAM memory block 21. Input FIFO read select signal 209a changes state during each rising edge of SRAMWCLK signal 511 and input FIFO read enable signal 210a is the NOR'ed combination of SRAMWCLK signal 511 and SRAMWEN signal 513.

Figure 4:
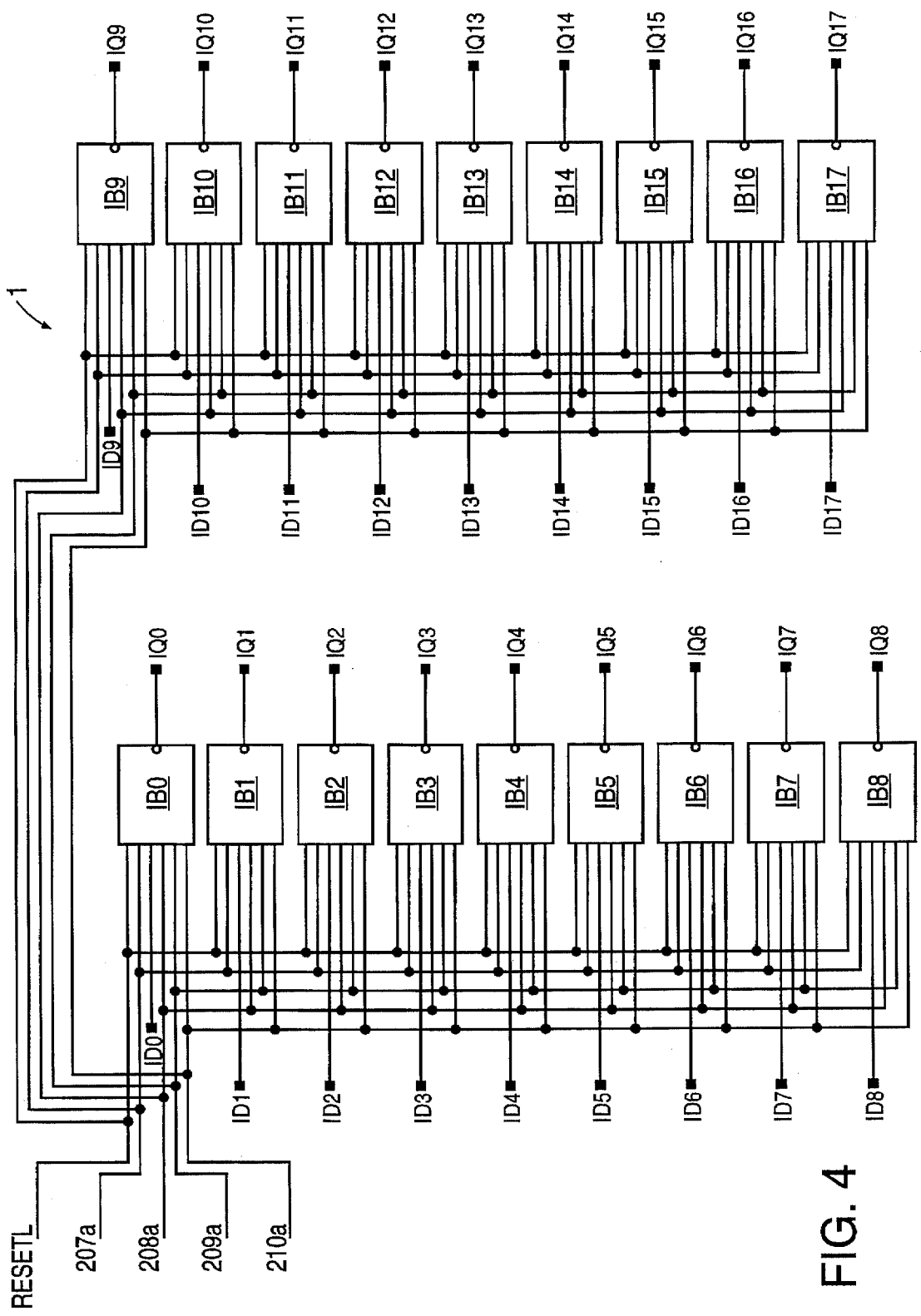
FIG. 4 is a block diagram of an input FIFO pair, including input FIFO buffer blocks.

FIG. 4 is a block diagram of input FIFO pair 1, including input FIFO buffer blocks IB0–IB17. The eighteen bits of each data value are applied to input terminals ID0–ID17 of input FIFO buffer blocks IB0–IB17. Input FIFO write enable signal 207a and input FIFO write select signal 208a determine whether these bits are written into input FIFO 11, input FIFO 15, or neither of these input FIFOs. If the bits are not written into either input FIFO 11 or input FIFO 15, they will be written into one of input FIFOs 12, 13, 14, 16, 17 or 18, following the order previously described.

Figure 5:
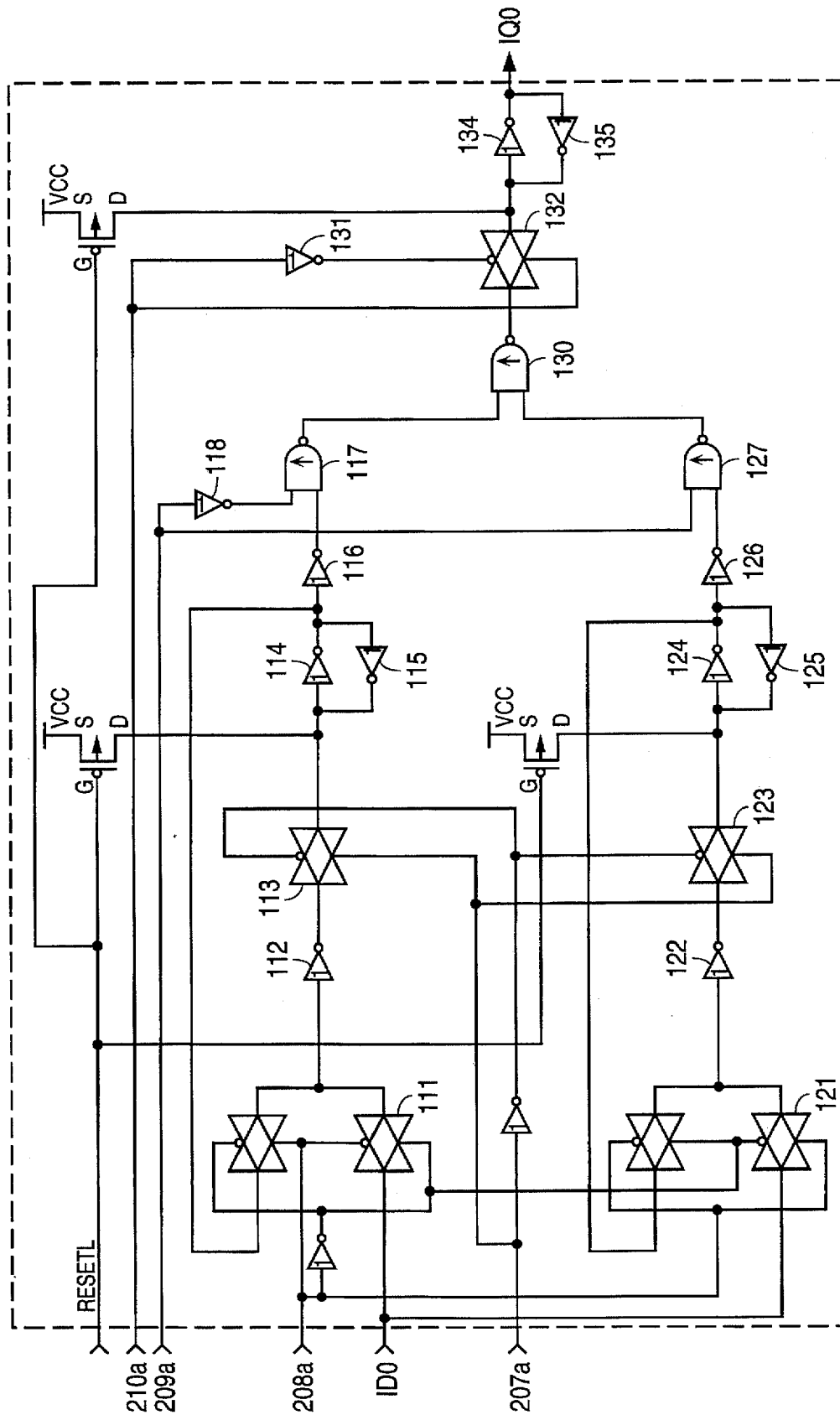
FIG. 5 is a schematic diagram of an input FIFO buffer block.

FIG. 5 is a schematic diagram of input FIFO buffer block IB0. Each of input FIFO buffer blocks IB0–IB17 contain the same circuitry. The upper portion of FIG. 5 illustrates the storage of one bit of a data value in input FIFO 11 and the lower portion of FIG. 5 illustrates the storage of one bit of a data value in input FIFO 15. During the first high state of input FIFO write enable signal 207a, input FIFO write select signal 208a is low (FIG. 3). The high input FIFO write enable signal 207a is applied to transmission gates 113 and 123, causing these gates to open (allowing signals to pass). The low input FIFO write select signal 208a opens transmission gate 111 and closes transmission gate 121. Consequently, the bit of the first applied data value passes through transmission gate 111, inverter 112, and transmission gate 113 so that the bit of the data value is stored in the latch formed by inverters 114 and 115. This latch stores the bit of the data value even after input FIFO write enable signal 207a transitions to a low state and closes transmission gates 113 and 123. Each of the eighteen input FIFO buffer blocks IB0–IB17 operates in the previously described manner to store the eighteen bits of the first data value in input FIFO 11.

The latch formed by inverters 114 and 115 stores the bit of the data value until input FIFO read select signal 209a and input FIFO read enable signal 210a cause the bit to be read out of the input FIFO buffer block IB0. Signals 209a and 210a cause this bit to be read out of input FIFO buffer block IB0 before input FIFO write enable signal 207a and input FIFO write select signal 208a cause another data value (the ninth data value) to be written into input FIFO 11.

During the next rising edge of input FIFO write enable signal 207a, the input FIFO write select signal 208a transitions to a high state, thereby opening transmission gate 121 and closing transmission gate 111. This causes a bit of the fifth applied data value to be transmitted through the circuitry in the lower portion of FIG. 4. This lower portion illustrates the storage of a bit of a data value in input FIFO 15. In a manner similar to that described above, the bit of the fifth data value is routed through transmission gate 121, inverter 122, transmission gate 123, and is stored in the latch formed by inverters 124 and 125. Each input FIFO buffer block IB0–IB17 operates in this manner to store all eighteen bits of the fifth data value in input FIFO 15. The latch formed by inverters 124 and 125 stores the bit of the data value until input FIFO read select signal 209a and input FIFO read enable signal 210a cause the bit to be read out of the input FIFO buffer block IB0. Signals 209a and 210a cause this bit to be read out of input FIFO buffer block IB0 before input FIFO write enable signal 207a and input FIFO write select signal 208a cause another data value (the fourteenth data value) to be written into input FIFO 15.

Because of the cyclical nature of input FIFO write enable signals 207a–d and input FIFO write select signals 208a–d, a data value will only be written into any particular input FIFO once every eight cycles. Therefore, after a data value has been written into a particular input FIFO, another data value will not be written into that input FIFO until seven cycles later. This seven cycle period provides time for the data value to be read out from the input FIFO and written into one of the SRAM memory blocks 21–24. Thus, if the input data stream has a frequency of 100 Mhz, 70 nanoseconds will elapse between the completion of a write operation for a particular input FIFO and the beginning of the next write operation for that input FIFO. Together, input FIFOs 11–18 are capable of receiving an input data stream having a frequency of 100 Mhz.

Input FIFO read select signal 209a and input FIFO read enable signal 210a cause the bits stored in input FIFOs 11 and 15 to be read out as follows. The bit of the data value stored in the latch formed by inverters 114 and 115 (corresponding to input FIFO 11) is transmitted through inverter 116 to one input of NAND gate 117 (FIG. 5). A low input FIFO read select signal 209a is transmitted through inverter 118, thereby applying a logic high signal to the other input of NAND gate 117. This enables NAND gate 117 to pass the (non-inverted) bit of the data value to one input of NAND gate 130. The other input of NAND gate 130 is the output of NAND gate 127. Because one of the inputs of NAND gate 127 is the low input FIFO read select signal 209a, the output of NAND gate 127 is high regardless of the value of the other input to NAND gate 127. Consequently, the output of NAND gate 130 is the inverted bit of the data value stored in the latch formed by inverters 114 and 115.

While the input FIFO read select signal 209a is still low, a high value of input FIFO read enable signal 210a is applied to inverter 131 and transmission gate 132, thereby opening transmission gate 132 and allowing the inverted data bit to pass to the latch formed by inverters 134 and 135 such that the (non-inverted) bit of the data value is provided to output IQ0.

In a similar manner, the bit stored in the latch formed by inverters 124 and 125 (corresponding to input FIFO 15) is read to output IQ0 by applying a high input FIFO read select signal 209a and a high input FIFO read enable signal 210a to the circuit of FIG. 5.

The structure of FIGS. 4 and 5 is repeated for input FIFO pairs 2–4. The writing of data values into input FIFO pair 2 (input FIFOs 12 and 16) is controlled by input FIFO write enable signal 207b and input FIFO write select signal 208b (FIG. 2). The writing of data values into input FIFO pair 3 (input FIFOs 13 and 17) is controlled by input FIFO write enable signal 207c and input FIFO write select signal 208c. The writing of data values into input FIFOs 14 and 18 is controlled by input FIFO write enable signal 207d and input FIFO write select signal 208d. Input FIFO read select signals and input FIFO read enable signals similar to signals 209a and 210a are used to read data values out from input FIFO pairs 2–4. These input FIFO read select and input FIFO read enable signals are derived from SRAMWCLK and SRAMWEN signals generated by state machines within SRAM memory blocks 22–24.

After a data value has been read from one of input FIFOs 11–18, the data value is written into one of SRAM memory blocks 21–24. Each SRAM memory block 21–24 contains a single port SRAM FIFO which receives data values from two of the eight input FIFOs. The data values read from input FIFOs 11 and 15 are alternately written to SRAM memory block 21 on data path 57a (FIG. 1). Similarly, data values read from input FIFOs 12 and 16 are alternately written to SRAM memory block 22 on data path 57b, data values read from input FIFOs 13 and 17 are alternately written to SRAM memory block 23 on data path 57c, and data values read from input FIFOs 14 and 17 are alternately written to SRAM memory block 24 on data path 57d. Each SRAM memory block 21–24 includes a state machine which controls the order of read and write operations within the SRAM memory block. The operation of SRAM memory blocks 21–24 and these state machines is described in more detail later in the specification.

De-interleaving the input data stream into four intermediate data streams (i.e., the outputs of input FIFO pairs 1–4) allows a high frequency input data stream to be written to SRAM memory blocks 21–24. For example, assuming that any one of the SRAM memory blocks 21–24 can perform a write operation in 20 nanoseconds, the maximum write frequency of a single SRAM memory block would be 25 Mhz (assuming that read and write operations are alternately performed). Such an SRAM memory block will not properly operate when connected directly to an input data stream with a frequency of 100 Mhz.

However, the structure of FIG. 1 de-interleaves the input data stream into four intermediate data streams which are transmitted from input FIFO pairs 1–4 to SRAM memory blocks 21–24 on leads 57a–57d, respectively. Each of these four data streams has a maximum frequency equal to one fourth of the frequency of the input data stream. Assuming the input data stream has a frequency of 100 Mhz, each of input FIFO pairs 1–4 outputs a data stream with a maximum frequency of 25 Mhz. An SRAM memory block having a maximum write frequency of 25 Mhz would have the capacity to properly receive data from input FIFO pairs 1–4. Thus, the structure of FIG. 1a allows an input data stream having a frequency of 100 Mhz to be de-interleaved and written into SRAM memory blocks 21–24.

After a data value has been written into one of SRAM memory blocks 21–24, the data value is read out of the respective SRAM memory block in a first in, first out sequence. As shown in FIG. 1b, each SRAM memory block 21–24 provides outputs to two of the eight output FIFOs 41–48. Data values are alternately read from SRAM memory block 21 to output FIFOs 41 and 45. Similarly, data values are alternately read from SRAM memory block 22 to output FIFOs 42 and 46, data values are alternately read from SRAM memory block 23 to output FIFOs 43 and 47, and data values are alternately read from SRAM memory block 24 to output FIFOs 44 and 48. Output FIFOs 41–48 receive data values which were originally transmitted through input FIFOs 11–18, respectively. Thus, data values transmitted through input FIFO 11 will be read to output FIFO 41, and data values transmitted through input FIFO 15 will be read to output FIFO 45.

The data values read out from SRAM memory blocks 21–24 are written into output FIFO pairs 31–34. Output FIFO pair 31 includes output FIFOs 41 and 45, output FIFO pair 32. includes output FIFOs 42 and 46, output FIFO pair 33 includes output FIFOs 43 and 47 and output FIFO pair 34 includes output FIFOs 44 and 48. Output FIFO pairs 31–34 are controlled in part by read control signals generated by read control logic block 36 (FIG. 1b). Read control logic block 36 receives a read clock signal (RCLK) 301 from read clock 30. In response, read control logic block 36 generates four output FIFO read enable signals 307a–307d, four output FIFO read select signals 308a–308d and four multiplexer enable signals 315a–315d.

Figure 6:
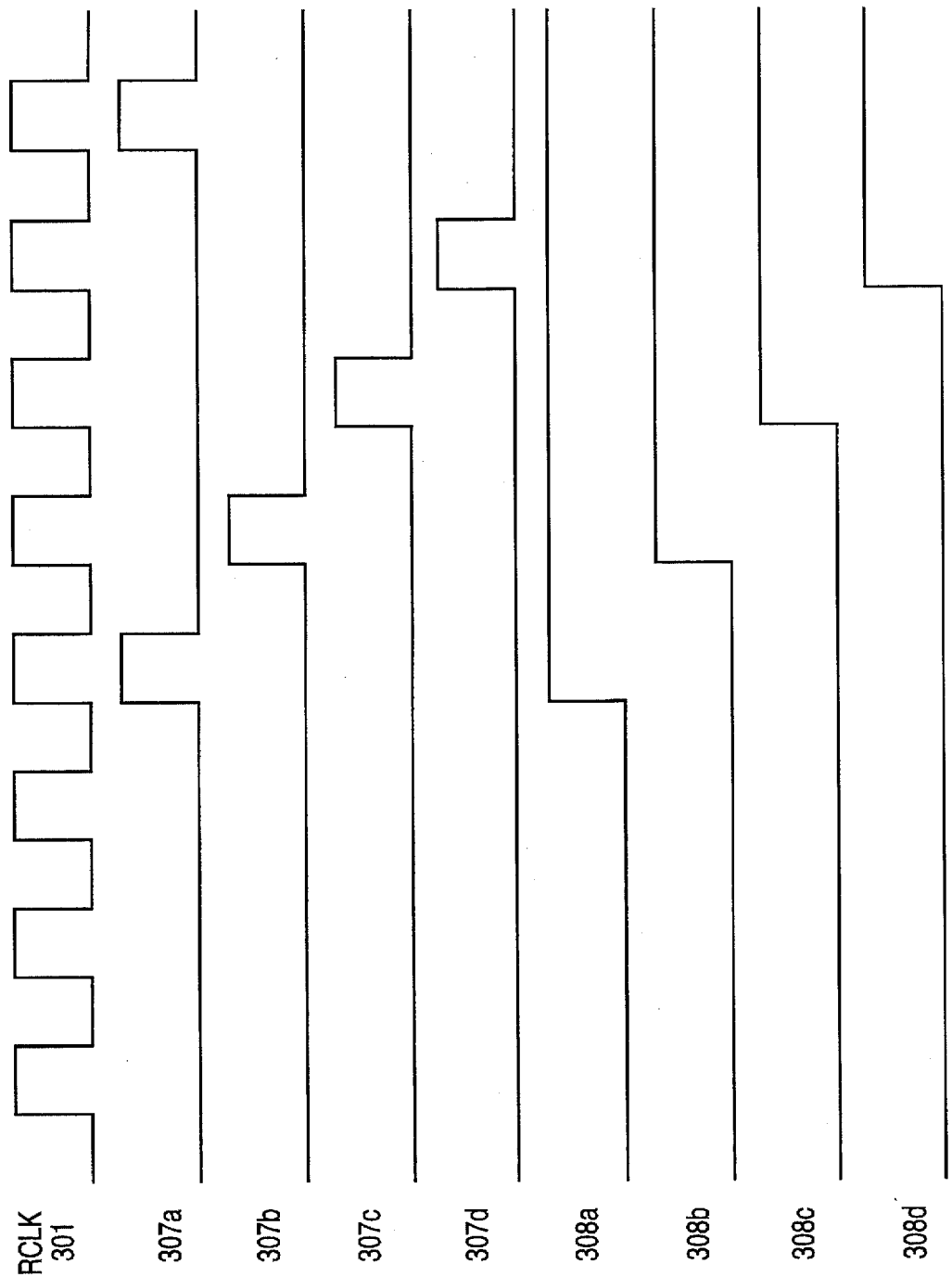
FIG. 6 is a waveform diagram illustrating a read clock signal, output FIFO read enable signals, and output FIFO read select signals.

FIG. 6 is a waveform diagram illustrating RCLK signal 301, output FIFO read enable signals 307a–307d, and output FIFO read select signals 308a–308d. The output FIFO read enable signals 307a–307d are transmitted to SRAM memory blocks 21–24 and output FIFO pairs 31–34. For example, output FIFO read enable signals 307a–307d are transmitted to SRAM memory blocks 21–24, respectively, and output FIFO pairs 31–34, respectively, on leads 27a–27d, respectively. Output FIFO read select signals 308a–308d are transmitted to output FIFO pairs 31–34, respectively, on leads 28a–28d, respectively. Output FIFO read enable signals 307a–307d go high once every four cycles of RCLK signal 301. Output FIFO read select signals 308a–308d change state on a rising edge of output FIFO read enable signals 307a–307d, respectively.

Figure 7:
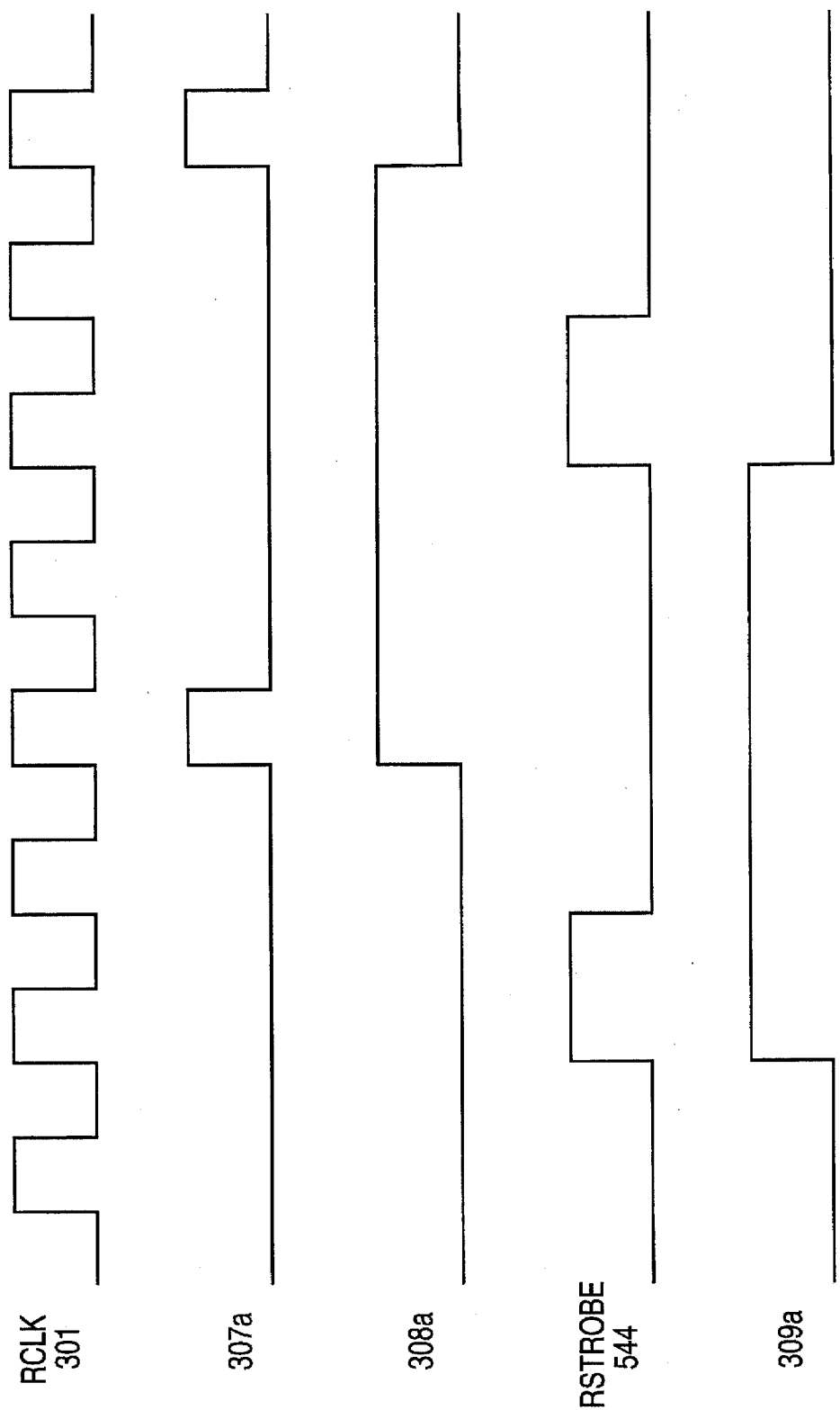
FIG. 7 is a waveform diagram illustrating a read clock signal, an output FIFO read enable signal, an output FIFO read select signal, an output FIFO write select signal and a read-strobe signal.

Each output FIFO pair 31–34 also receives signals which originate in a state machine within the SRAM memory block associated with the output FIFO pair. For example, output FIFO pair 31 receives a read-strobe (RSTROBE) signal 544 from state machine 71 within SRAM memory block 21. The detailed operation of state machine 71 is described later. For now it is noted that RSTROBE signal 544 is enabled each time a data value is read out of SRAM memory block 21. Output FIFO pair 31 also receives an output FIFO write select signal 309a which changes state on each rising edge of RSTROBE signal 544. FIG. 7 is a waveform diagram illustrating RCLK signal 301, output FIFO read enable signal 307a, output FIFO read select signal 308a, output FIFO write select signal 309a and RSTROBE signal 544.

The operation of output FIFOs 41–48 is now described using output FIFO pair 31 as an example. RSTROBE signal 544 from state machine 71 and output FIFO write select signal 309a control the writing of data values into output FIFOs 41 and 45 from SRAM memory block 21. Output FIFO read enable signal 307a and output FIFO select signal 308a control the reading of data values from output FIFOs 41 and 45.

Figure 8:
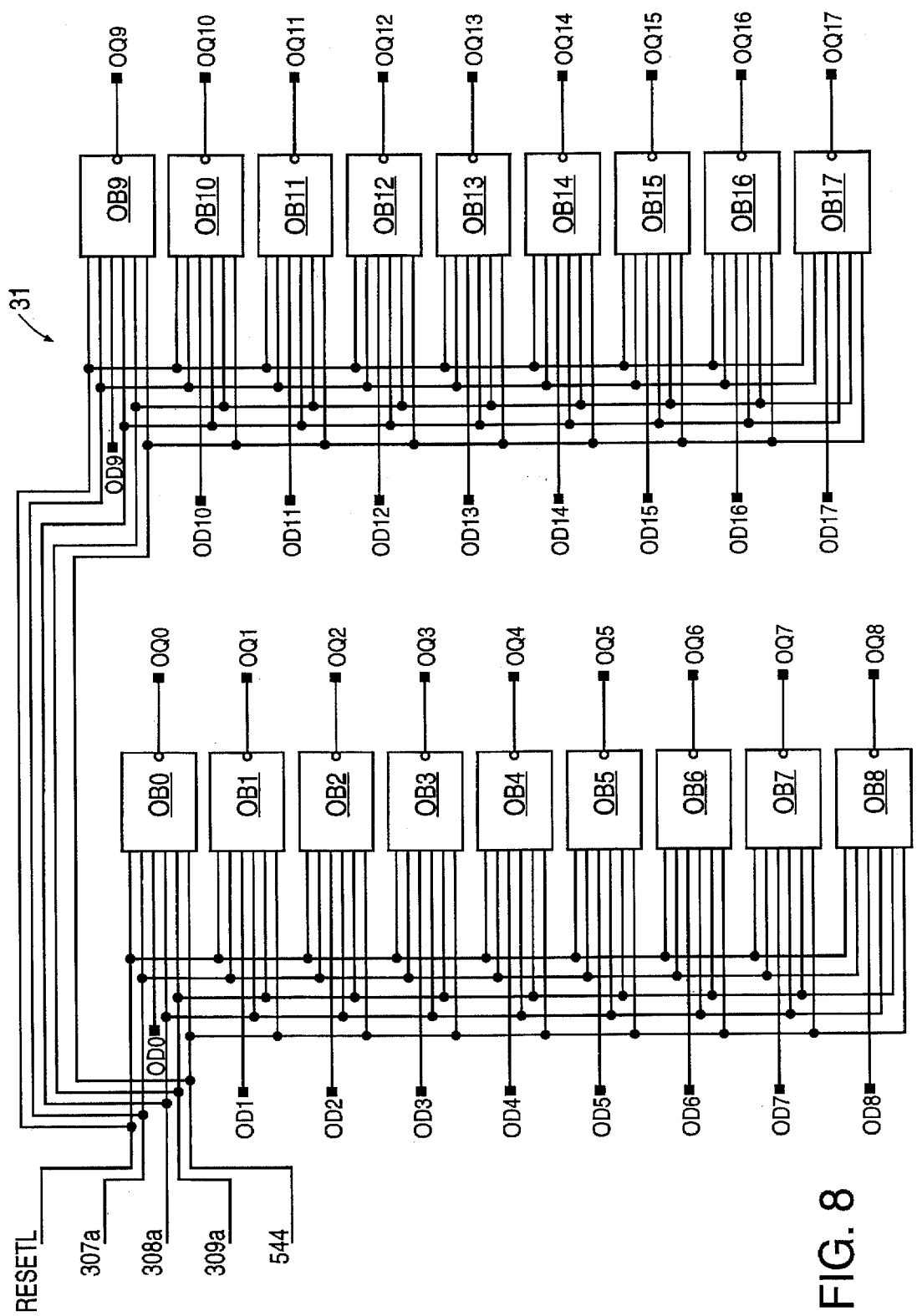
FIG. 8 is a block diagram of an output FIFO pair, including output FIFO buffer blocks.

FIG. 8 is a block diagram of output FIFO pair 31, including output FIFO buffer blocks OB0–OB17. The eighteen bits of the data values read out of SRAM memory block 21 are applied to input terminals OD0–OD17 of output FIFO buffer blocks OB0–OB17.

Figure 9:
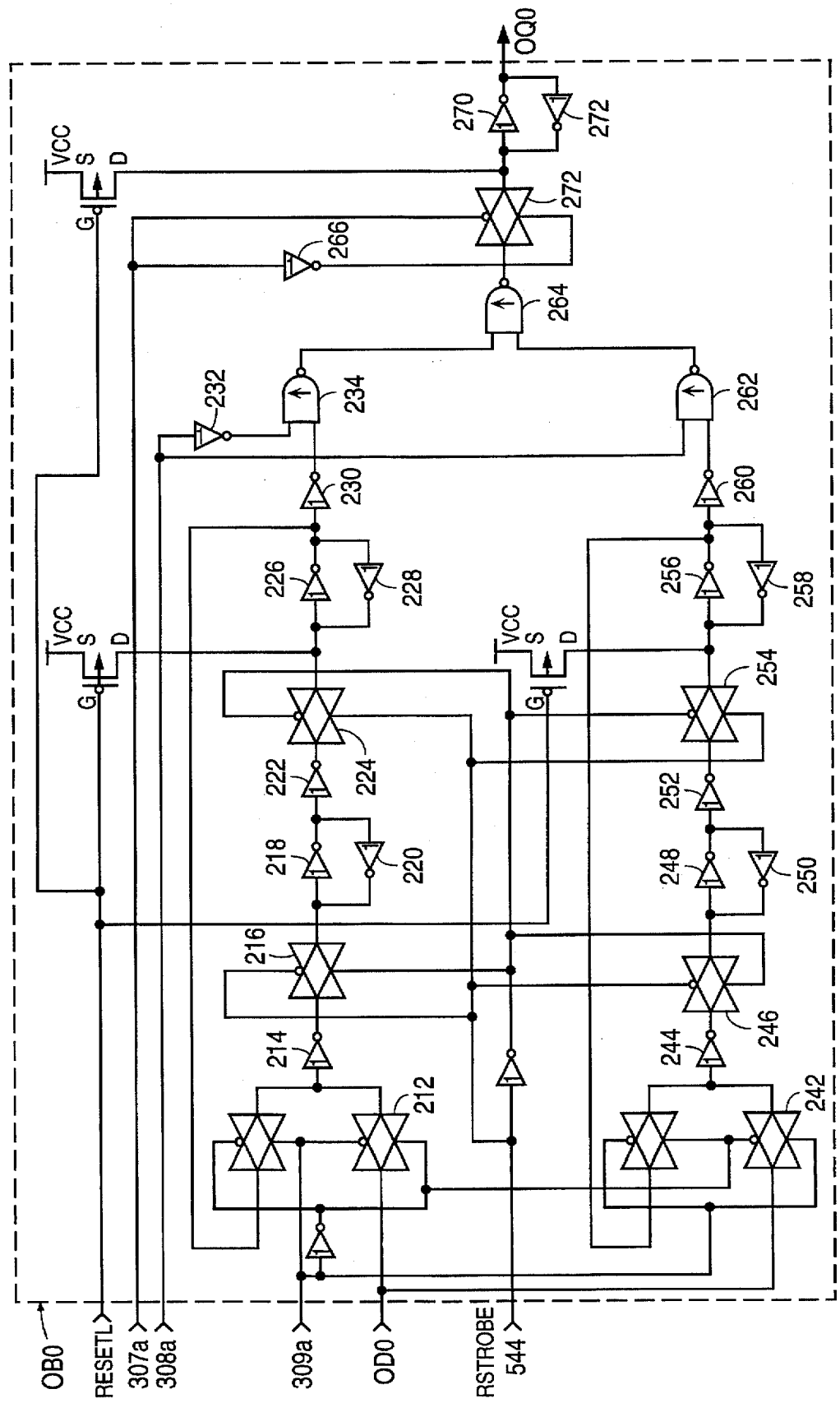
FIG. 9 is a logic diagram of an output FIFO buffer block.

FIG. 9 is a logic diagram of output FIFO buffer block OB0. Each of output FIFO buffer blocks OB0–OB17 contains the same circuitry. The upper portion of the output FIFO buffer block of FIG. 9 illustrates the storage of one bit of a data value in output FIFO 41, and the lower portion of FIG. 9 illustrates the storage of one bit of a data value in output FIFO 45.

When the first data value is read from SRAM memory block 21 and written to output FIFO pair 31, output FIFO write select signal 309a and RSTROBE signal 544 are low (FIG. 7). The low output FIFO write select signal 309a enables transmission gate 212 and disables transmission gate 242 such that the bit of the data value is passed through transmission gate 212. In this manner, the output FIFO write select signal 309a determines whether the data value read from SRAM memory block 21 is written into output FIFO 41 or output FIFO 45. The low RSTROBE signal 544 opens transmission gates 216 and 246 while closing transmission gates 224 and 254. This enables the bit of the data value to be transmitted through inverter 214 and transmission gate 216 so that the bit of the data value is stored in the latch formed by inverters 218 and 220.

When the state machine 71 determines that a data value is to be read from SRAM memory block 21, state machine 71 causes RSTROBE signal 544 to transition to a high state. When RSTROBE signal 544 goes high, transmission gates 216 and 246 are closed and transmission gates 224 and 254 are opened. This allows the bit of the data value to pass through inverter 222, transmission gate 224 and be stored in the latch formed by inverters 226 and 228.

When RSTROBE signal 544 goes high, output FIFO write select signal 309a transitions to a high state, causing transmission gate 212 to close and transmission gate 242 to open. The RSTROBE signal 544 subsequently transitions to a low state, closing transmission gates 224 and 254, and opening transmission gates 216 and 246. This configuration allows the next data value read out from SRAM memory block 21 to be written into output FIFO 45 (represented by the lower portion of the circuitry of FIG. 9).

Output FIFO read enable signal 307a and output FIFO read select signal 308a enable the bit of the data value to be read out of the latch formed by inverters 226 and 228. Output FIFO read select signal 308a is initially low, thereby enabling the bit of the data value to pass from the latch formed by inverters 226 and 228 through inverter 230, NAND gate 234 and NAND gate 264. The output FIFO read enable signal 307a, which is also low, opens transmission gate 268 and thereby stores the data value in the output latch formed by inverters 270 and 272. The output FIFO read enable signal 307a then transitions to a high state, thereby closing transmission gate 268 and isolating the data value stored in inverters 270 and 272 from the remainder of the output FIFO circuitry. While transmission gate 268 is closed, the bit of the data value stored in inverters 270 and 272 is read to data output multiplexer 49 as described below.

In a similar manner, the signals 307a, 308a, 309a and 544 cause the next data value read from SRAM memory block 21 to be transmitted through output FIFO 45 (corresponding to the lower portion of the circuitry of FIG. 9).

The structure of FIGS. 8 and 9 is repeated in output FIFO pairs 32–34. The writing of data values into output FIFO pair 32–34 is controlled by RSTROBE signals and output FIFO write select signals similar to RSTROBE signal 544 and output FIFO write select signal 309a. These RSTROBE and output FIFO write select signals are derived from RSTROBE signals generated by state machines within SRAM memory blocks 22–24. The reading of data values from output FIFO pair 32 is controlled by output FIFO read enable signal 307b and output FIFO read select signal 308b (FIG. 6). The reading of data values from output FIFO pair 33 is controlled by output FIFO read enable signal 307c and output FIFO read select signal 308c. The reading of data values from output FIFO pair 34 is controlled by output FIFO read enable signal 307d and output FIFO read select signal 308d.

Figure 10A:
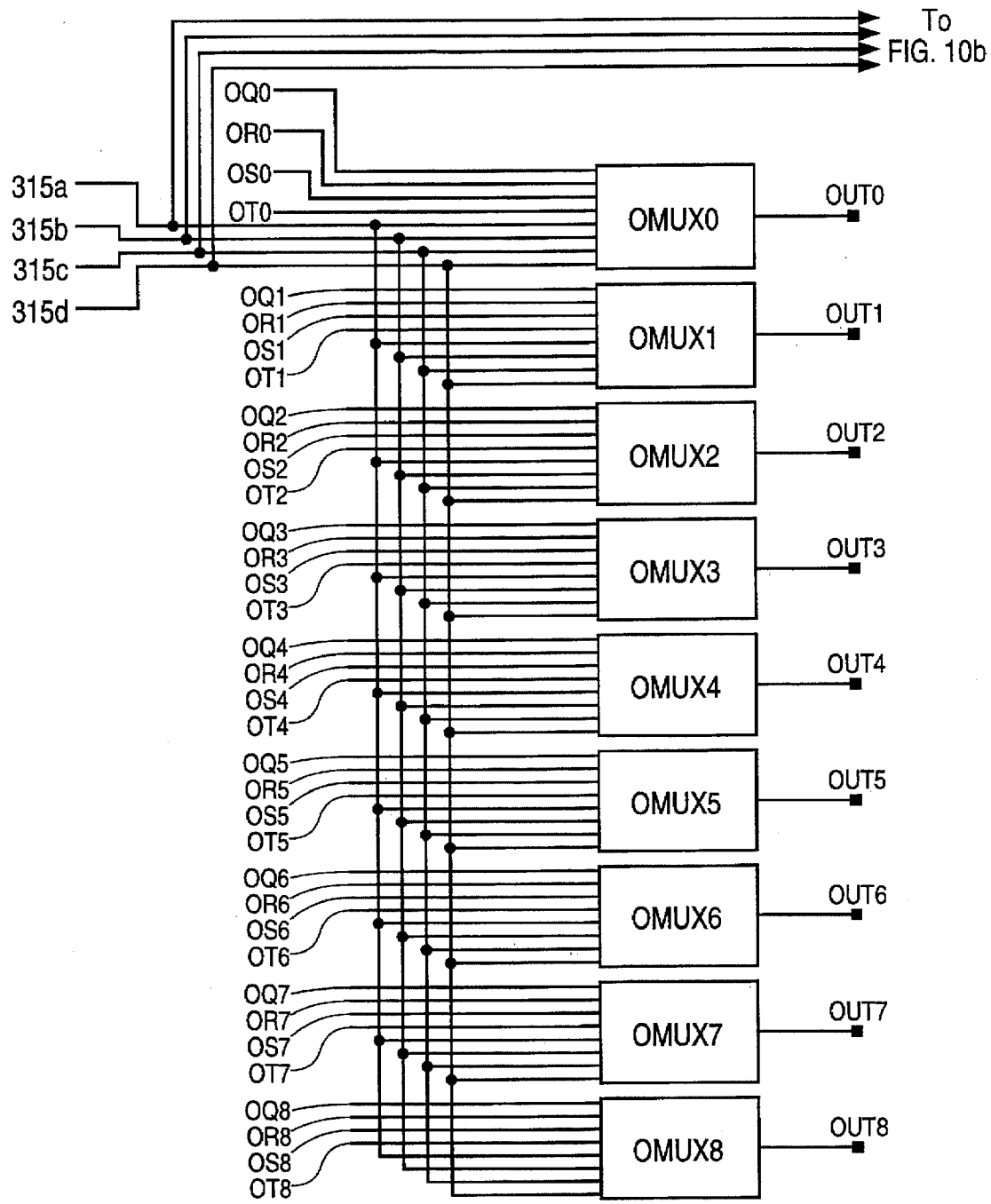
FIG. 10 is a block diagram of an output multiplexer, wherein FIG. 10 consists of the portions illustrated in FIG. 10a and FIG. 10b.
Figure 10:
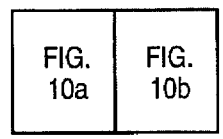
Figure 10B:
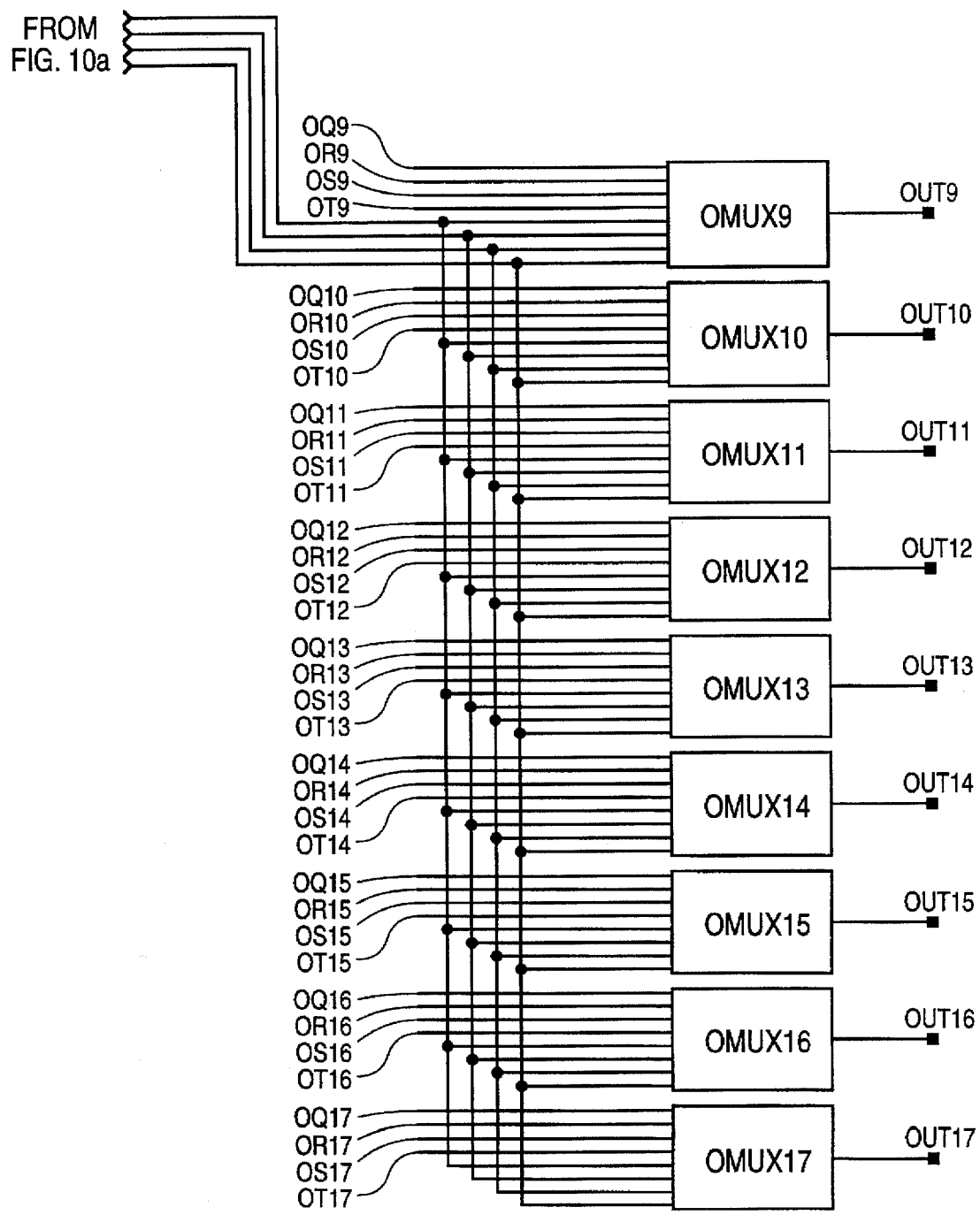

FIG. 10 is a block diagram of data output multiplexer 49, (FIG. 1b) wherein FIG. 10 consists of the portions illustrated in FIG. 10a and FIG. 10b. The data output multiplexer 49 sequentially enables the data values read out from output FIFOs 41–48 to be transmitted to output port 50. The data values read out of each output-FIFO pair 31–34 are provided to output multiplexers OMUX0–OMUX17 (FIGS. 10a–10b). For example, the output bits OQ0–OQ17 of output FIFO pair 31 are provided to OMUX0–OMUX17, respectively. Output bits OR0–OR17 of output FIFO pair 32 are provided to output multiplexers OMUX0–OMUX17, respectively. Output bits OS0–OS17 of output FIFO pair 33 are provided to output multiplexers OMUX0–OMUX17, respectively. Output bits OT0–OT17 of output FIFO pair 34 are provided to output multiplexers OMUX0–OMUX17, respectively.

Output multiplexers OMUX0–OMUX17 also receive multiplexer enable signals 315a–315d from read control block 36 on lines 325a–325d, respectively. These multiplexer enable signals 315a–315d enable one set of output bits, OQ0–OQ17, OR0–OR17, OS0–OS17 or OT0–OT17, to pass through output multiplexers OMUX0–OMUX17 to outputs OUT0–OUT17 (FIGS. 10a–10b).

Figure 11:
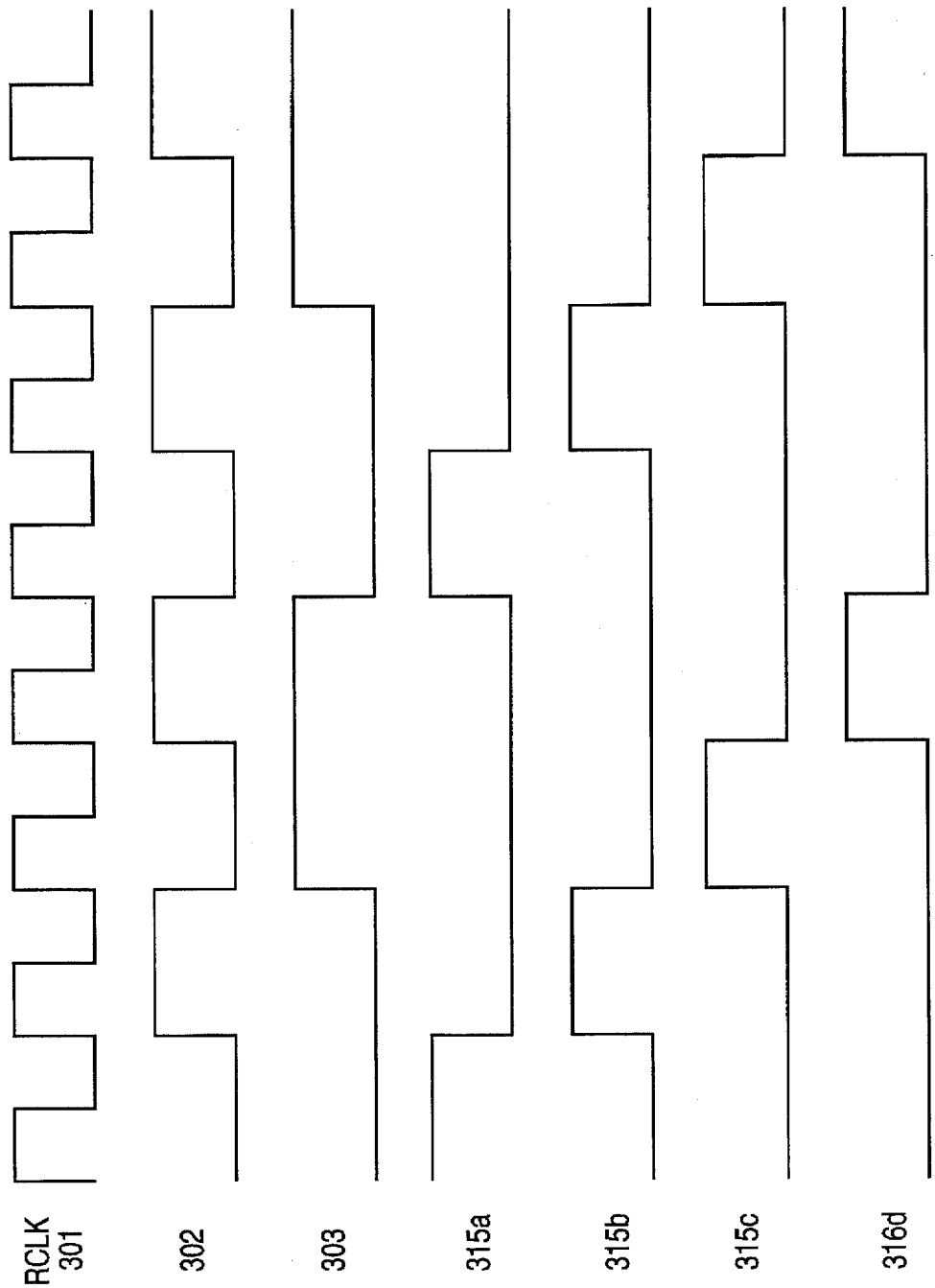
FIG. 11 is a waveform diagram illustrating a read clock signal, data output select signals, and multiplexer enable signals.

FIG. 11 is a waveform diagram illustrating RCLK signal 301, data output select signals 302–303 and multiplexer enable signals 315a–315d. To generate multiplexer enable signals 315a–315d, RCLK signal 301 is provided to a two-bit binary counter, resulting in the creation of data output select signals 302 and 303. Data output select signal 302 changes state during each rising edge of RCLK signal 301. Data output select signal 303 changes state during each falling edge of data output select signal 302.

Figure 12:
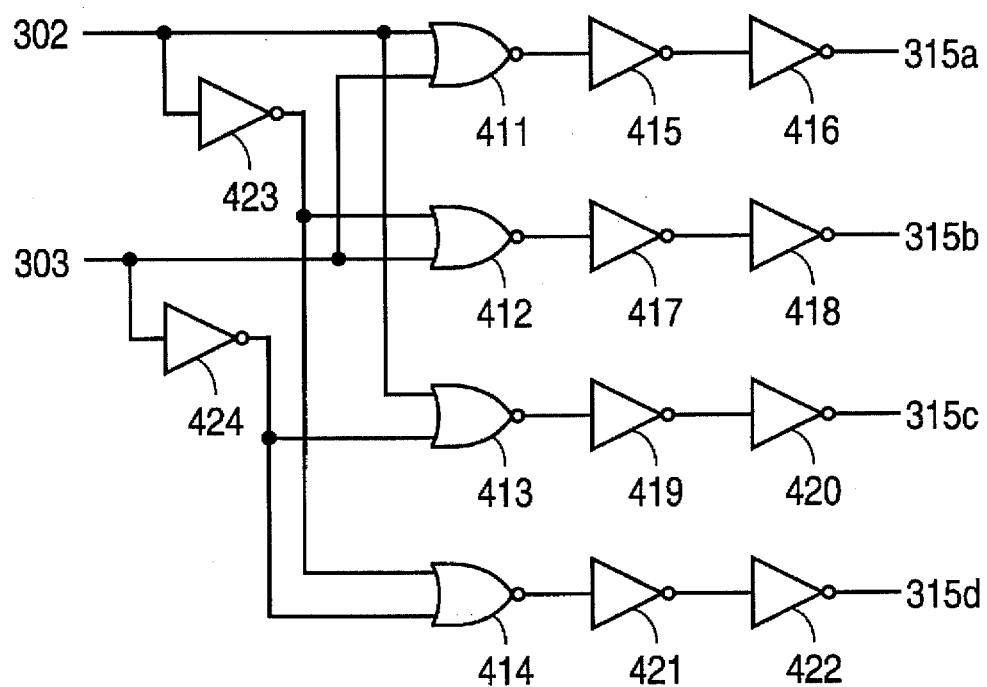
FIG. 12 is a logic diagram of circuitry used to create multiplexer enable signals.

FIG. 12 is a logic diagram of circuitry used to create multiplexer enable signals 315a–315d. Data output select signal 302 is provided to inputs of NOR gates 411 and 413. Data output select signal 302 is inverted also by inverter 423 and provided to inputs of NOR gates 412 and 414. Data output select signal 303 is provided to inputs of NOR gates 411 and 412. Data output select signal 303 is also inverted by inverter 424 and provided to inputs of NOR gates 413 and 414. The outputs of NOR gates 411–414 are amplified by amplifying inverters 415–422 to create multiplexer enable signals 315a–315d. Each pair of inverters 415–416, 417–418, 419–420, and 421–422 is a non-inverting buffer. Multiplexer enable signals 315a–315d are thereby sequentially enabled, with signal 315a being high during the first cycle of RCLK signal 301, signal 315b being high during the second cycle of RCLK signal 301, signal 315c being high during the third cycle of RCLK signal 301 and signal 315d being high during the fourth cycle of RCLK signal 301.

Figure 13:
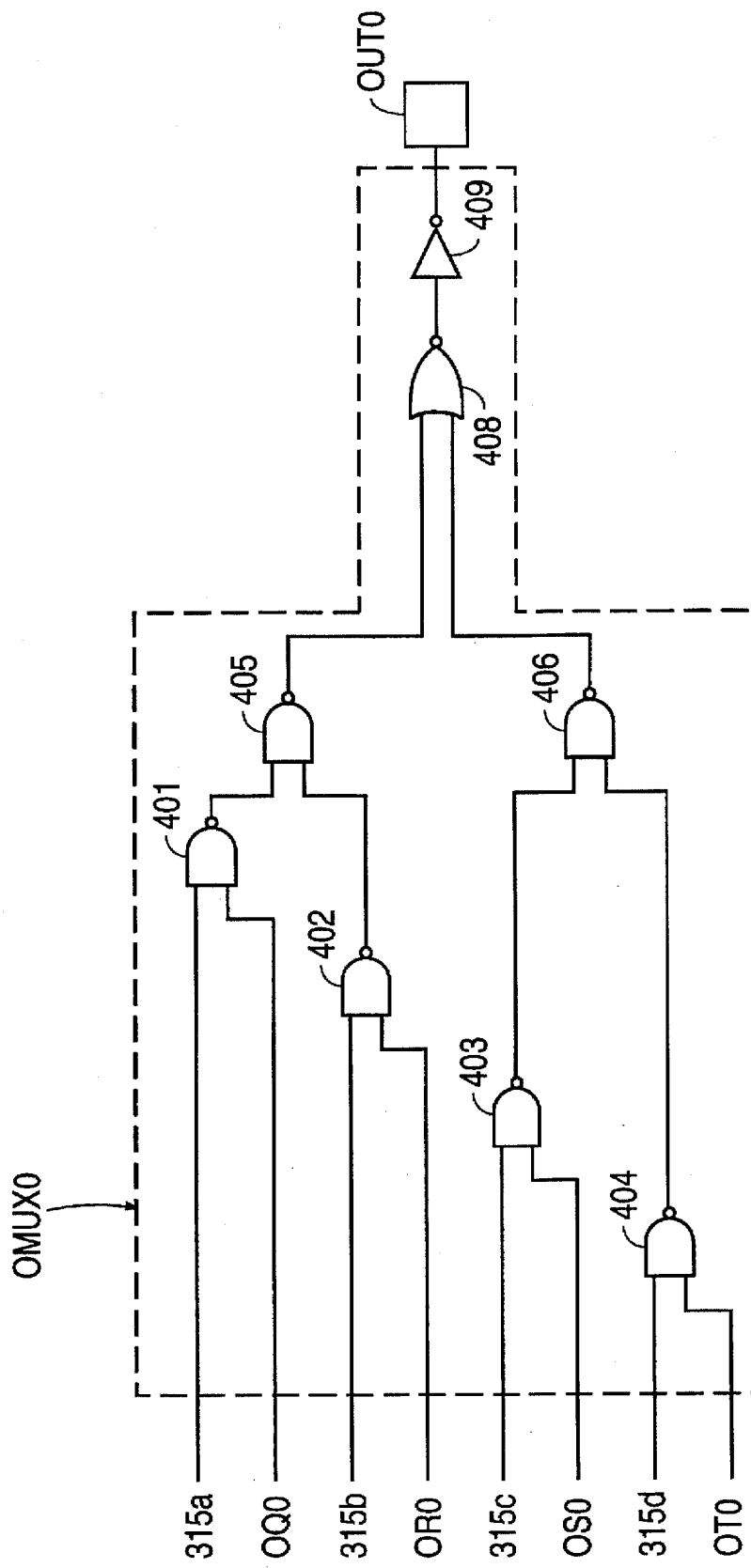
FIG. 13 is a logic diagram of circuitry of an output multiplexer.

FIG. 13 is a logic diagram illustrating circuitry of output multiplexer OMUX0. Output multiplexers OMUX1–OMUX17 contain the same circuitry as output multiplexer OMUX0. Thus, the discussion of output multiplexer OMUX0 also applies to output multiplexers OMUX1–OMUX17. Within output multiplexer OMUX0, multiplexer enable signal 315a and output bit OQ0 (from output FIFO pair 31) are provided to the inputs of NAND gate 401. Multiplexer enable signal 315b and output bit OR0 (from output FIFO pair 32) are provided to the inputs of NAND gate 402. Multiplexer enable signal 315c and output data bit 0S0 (from output FIFO pair 33) are provided to the inputs of NAND gate 403. Multiplexer enable signal 315d and output data bit OT0 (from output FIFO pair 34) are provided to the inputs of NAND gate 404. The outputs of NAND gates 401 and 402 are provided to the inputs of NAND gate 405. The outputs of NAND gates 403 and 404 are provided to inputs of NAND gate 406. The outputs of NAND gates 405 and 406 are provided to the inputs of NOR gate 408. The output of NOR gate 408 is transmitted through amplifying inverter 409 and provided to output OUT0.

Outputs OUT0–OUT17 carry values which represent the 18 data bits of each data value which is presented to output port 50. Multiplexer enable signals 315a, 315b, 315c and 315d sequentially enable NAND gates 401, 402, 403 and 404, respectively, thereby enabling output data bits OQ0, OR0, 0S0 and OT0, respectively, to pass through the circuitry of output multiplexer OMUX0 to output OUT0. In this manner, the data values which were sequentially read in to input FIFOs 11–18 are sequentially read out from output FIFOs 41–48.

The above described configuration allows data to be read at a high frequency from SRAM memory blocks 21–24 to output port 50. Assuming that any one of the SRAM memory blocks 21–24 can perform a read operation in 20 nanoseconds, the maximum read frequency of a single SRAM memory block would be 25 Mhz (assuming that read and write operations are alternately performed). Such an SRAM memory block does not have the capacity to produce a data output stream with a frequency of 100 Mhz.

However, in the structure of FIG. 1b, each of the four SRAM memory blocks 21–24 outputs an intermediate data stream with a maximum read frequency of 25 Mhz. These four intermediate data streams are transmitted through output FIFO pairs 31–34 and interleaved within output multiplexer 49, thereby creating an output data stream having a frequency of 100 Mhz. A state machine in each SRAM memory block 21–24 controls the read operations within its respective SRAM memory block. The operation of SRAM memory blocks 21–24 and these state machines is described in more detail later in the specification.

Figure 14:
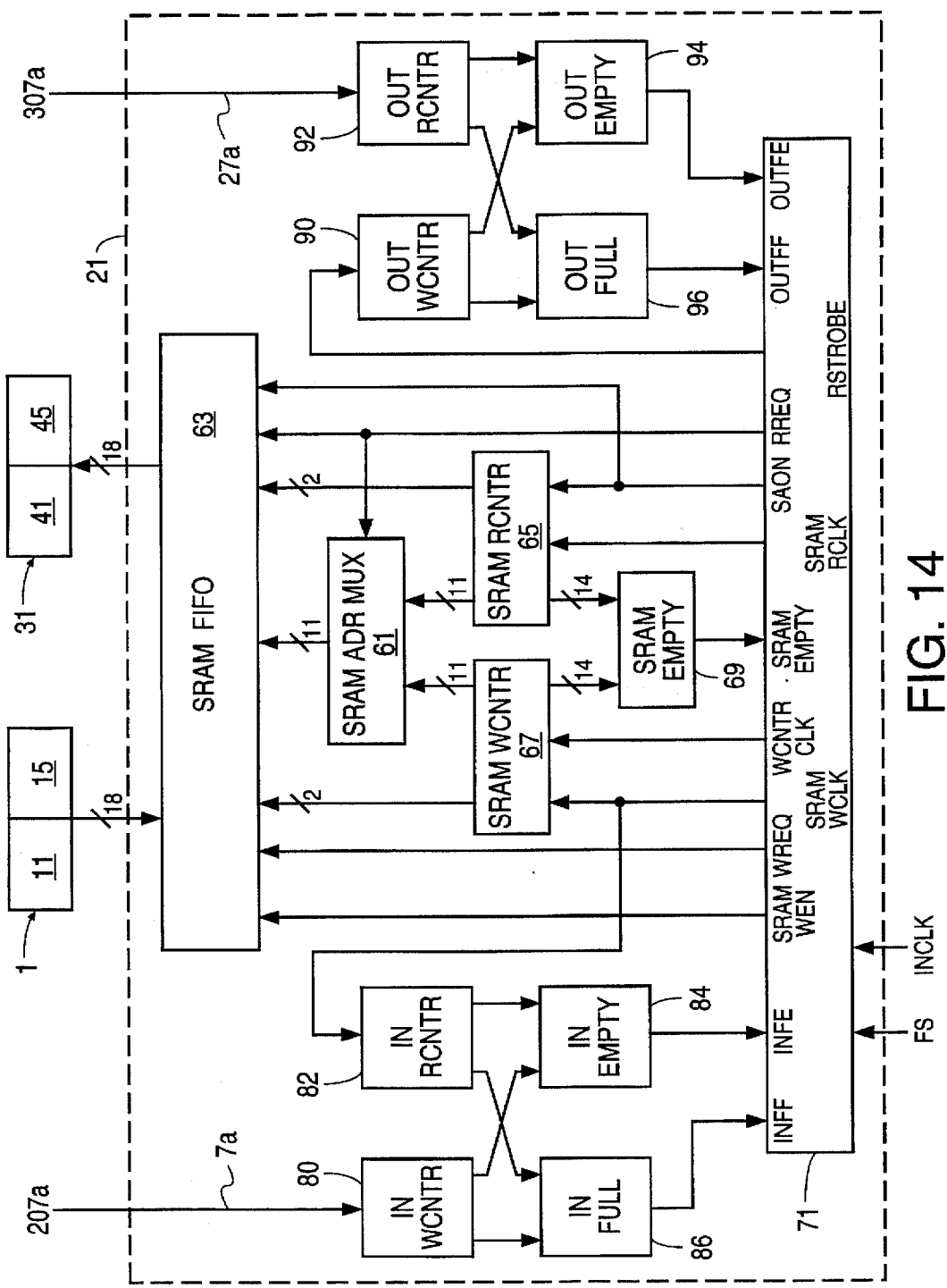
FIG. 14 is a block diagram of components present within an SRAM memory block.

The control and operation of SRAM memory blocks 21–24 will now be described in detail. FIG. 14 is a block diagram of components present within SRAM memory block 21, including input FIFO write counter 80, input FIFO read counter 82, input FIFO empty block 84, input FIFO full block 86, output FIFO write counter 90, output FIFO read counter 92, output FIFO empty block 94, output FIFO full block 96, SRAM address multiplexer 61, single port SRAM FIFO 63, SRAM read counter 65, SRAM write counter 67, SRAM empty block 69, and state machine 71. For reasons of clarity, the circuitry coupling the SRAMWEN and SRAMWCLK signals to input FIFO pair 1 and the circuitry coupling the RSTROBE signal to output FIFO pair 31 are not illustrated in FIG. 14.

While FIG. 14 is a block diagram of SRAM memory block 21, it is understood that this block diagram is representative of SRAM memory blocks 22–24. Therefore, the following discussion, which uses SRAM memory block 21 as an example, also applies to SRAM memory blocks 22–24.

The data values read from input FIFO pair 1 are written into SRAM FIFO 63 and data values read from SRAM FIFO 63 are written to output FIFO pair 31. In one embodiment, SRAM FIFO 63 is a conventional 4 kbyte single port SRAM FIFO.

Figure 15:
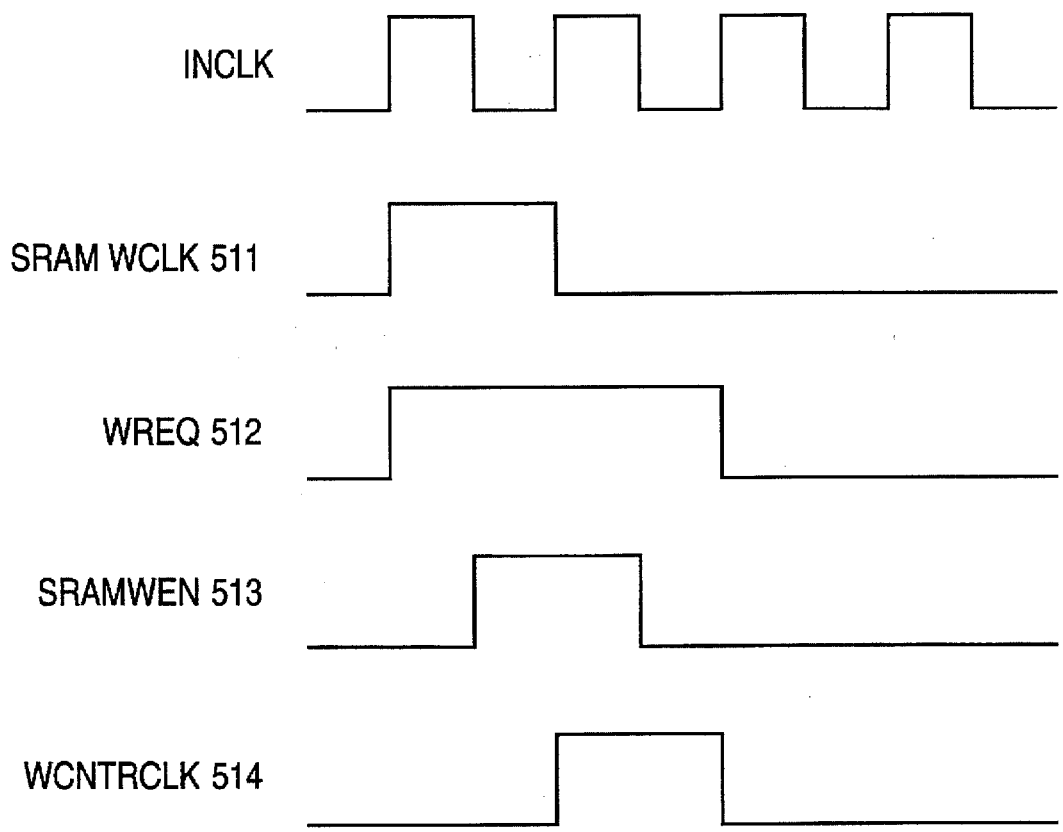
FIG. 15 is a waveform diagram illustrating signals generated by a state machine to perform a write operation from an input FIFO pair to an SRAM FIFO.

FIG. 15 is a waveform diagram illustrating the signals generated by state machine 71 to perform a write operation from input FIFO pair 1 to SRAM FIFO 63. To perform a write operation to SRAM FIFO 63, state machine 71 generates an SRAM write enable (SRAMWEN) signal 513, a write request (WREQ) signal 512, an SRAM write clock (SRAMWCLK) signal 511 and a write counter clock (WCNTRCLK) signal 514. FIG. 15 illustrates the timing of SRAMWCLK signal 511, WREQ signal 512, SRAMWEN signal 513 and WCNTRCLK signal 514. The sequence shown in FIG. 15 is generated by state machine 71 each time a data value is written into SRAM FIFO 63 from input FIFO pair 1.

SRAMWEN signal 513 is transmitted directly from state machine 71 to SRAM FIFO 63. SRAMWEN signal 513 is a write enable pulse which is asserted to perform a write operation within SRAM FIFO 63.

SRAMWCLK signal 511 and WCNTRCLK signal 514 are transmitted to SRAM write counter block 67. SRAM write counter block 67 is a convention address counter. These signals increment a set of address counters within SRAM write counter block 67. SRAM write counter block 67 generates a 2-bit address output, an 11-bit address output and a 14-bit address output. The 2-bit address output of SRAM write counter 67, which is transmitted to SRAM FIFO 63, is a column select signal which is used to address columns within SRAM FIFO 63 during a write operation. The 11-bit address output of SRAM write counter 67, which is transmitted to SRAM address multiplexer 61, is a row select signal which is used to address rows within SRAM FIFO 63 during a write operation. The 14-bit address output of SRAM write counter 67, which is transmitted to SRAM empty block 69, is representative of the number of write operations performed within SRAM FIFO 63.

WREQ signal 512 is transmitted from state machine 71 to SRAM FIFO 63. During normal operation of SRAM memory block 21, WREQ signal 512 and read request (RREQ) signal 542 are complementary signals (i.e., one is high when the other is low). Thus, when a write operation is being performed, WREQ signal 512 is high and RREQ signal 542 is low. The low value of RREQ signal 542 is applied to SRAM address multiplexer 61, causing the 11-bit address output of SRAM write counter 67 to be transmitted through SRAM address multiplexer 61 to SRAM FIFO 63. SRAM address multiplexer 61 is a conventional multiplexer.

WREQ signal 512 and RREQ signal 542 are also used to enable SRAM FIFO 63. If either RREQ signal 542 or WREQ signal 512 are enabled, SRAM FIFO 63 is enabled. However, if both RREQ signal 542 and WREQ 512 signal are low, SRAM FIFO 63 shuts itself off to conserve energy.

Figure 16:
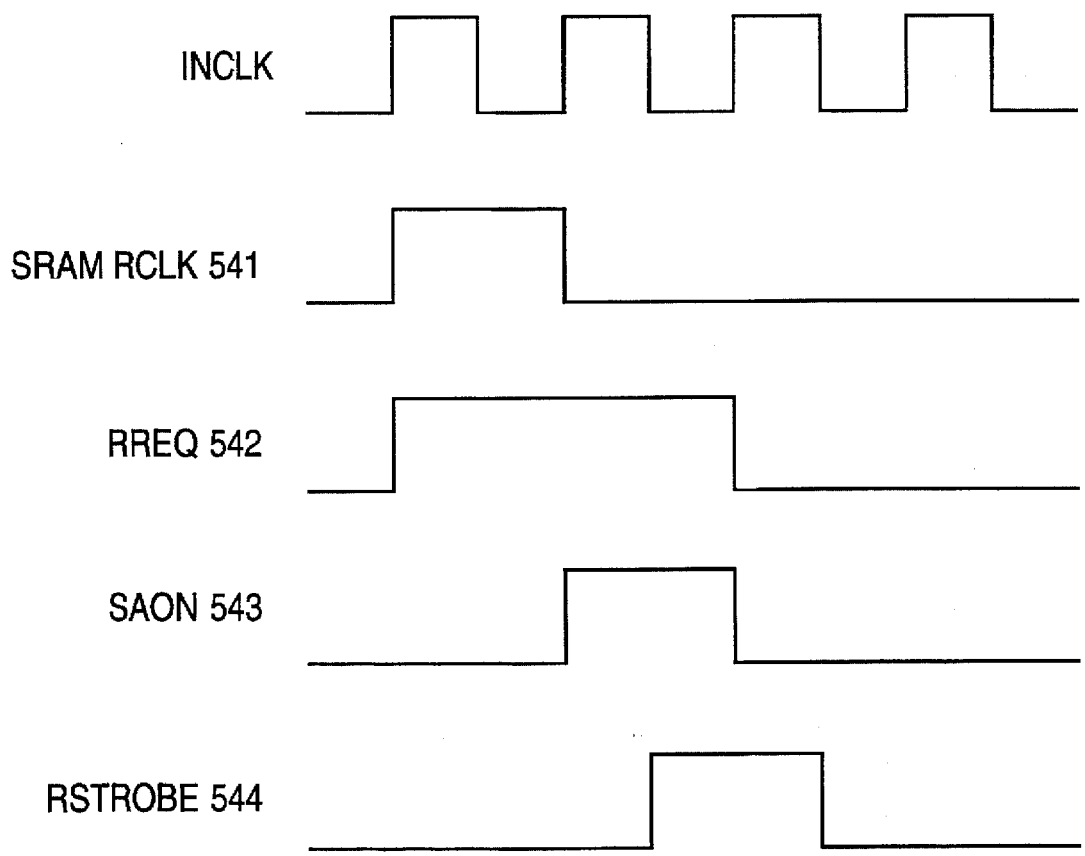
FIG. 16 is a waveform diagram illustrating signals generated by a state machine to perform a read operation from an SRAM FIFO to an output FIFO pair.

FIG. 16 is a waveform diagram illustrating the signals generated by state machine 71 to perform a read operation from SRAM FIFO 63 to output FIFO pair 31. To perform a read operation from SRAM FIFO 63, state machine 71 generates an SRAM read clock (SRAMRCLK) signal 541, RREQ signal 542, sense amplifier on (SAON) signal 543, and read-strobe (RSTROBE) signal 544. FIG. 16 illustrates the timing of SRAMRCLK signal 541, RREQ signal 542, SAON signal 543, and RSTROBE signal 544. The sequence shown in FIG. 16 is generated by state machine 71 each time a data value is read from SRAM FIFO 63 to output FIFO 31.

SAON signal 543 is transmitted from state machine 71 to SRAM FIFO 63. SAON signal 543 is a read enable signal which turns on a sense amplifier within SRAM FIFO 63 to perform a read operation within SRAM FIFO 63.

SAON signal 543 is also transmitted from state machine 71 to SRAM read counter 65. In addition, SRAMRCLK signal 541 is transmitted from state machine 71 to SRAM read counter 65. SRAM read counter 65 is a conventional counter. These signals increment a set of address counters within SRAM read counter block 65. SRAM read counter block 65 generates a 2-bit address output, an 11-bit address output and a 14-bit address output. The 2-bit address output of SRAM read counter 65, which is transmitted to SRAM FIFO 63, is a column select signal used to address columns within SRAM FIFO 63 during a read operation. The 11-bit address output of SRAM read counter 65, which is transmitted to SRAM address multiplexer 61, is a row select signal used to address rows within SRAM FIFO 63 during a read operation. The 14-bit address output of SRAM read counter 65, which is transmitted to SRAM empty block 69, is representative of the number of read operations performed within SRAM FIFO 63.

As previously discussed, RREQ signal is transmitted to SRAM address multiplexer 61 and SRAM FIFO 63. When a read operation is being performed, RREQ signal 542 is high, thereby causing the 11-bit address output of SRAM read counter 65 to be transmitted through SRAM address multiplexer 61 to SRAM FIFO 63.

Based on the inputs which it receives, state machine 71 determines whether to generate the signals necessary to perform a write operation, a read operation, or neither of these operations within SRAM FIFO 63. The inputs to state machine 71 include an input FIFO full (INFF) signal, an input FIFO empty (INFE) signal, an output FIFO full (OUTFF) signal, an output FIFO empty (OUTFE) signal, a frequency select (FS) signal, an input clock (INCLK) signal and an SRAM empty (SRAME) signal.

As shown in FIG. 14, blocks 80–86 generate the INFE and INFF signals. Input FIFO write counter 80 receives input FIFO write enable signal 207a on lead 7a. Input FIFO write counter 80 is a 2-bit counter that is incremented each time a data value is written into either input FIFO 11 or 15 (i.e., at each rising edge of input FIFO write enable signal 207a). The output of input FIFO write counter 80 is provided to input FIFO empty block 84 and input FIFO full block 86.

Input FIFO read counter 82 receives SRAMWCLK signal 511 from state machine 71. Input FIFO read counter 82 is a 2-bit counter that is incremented each time a data value is read out from input FIFO 11 or 15 (i.e., at each rising edge of SRAMWCLK signal 511). The output of input FIFO read counter 82 is provided to the input FIFO empty block 84 and input FIFO full block 86. By comparing the number of read and write operations performed within input FIFOs 11 and 15, input FIFO full block 86 determines whether a data value is stored in both input FIFO 11 and input FIFO 15. If both input FIFO 11 and input FIFO 15 contain a data value, input FIFO full block 86 transmits the INFF signal to state machine 71 to indicate that input FIFO pair 1 is full. In a similar manner, input FIFO empty block 84 determines whether there are no data values stored in either input FIFO 11 or input FIFO 15. If neither input FIFO 11 nor input FIFO 15 contain a data value, the input FIFO empty block 84 transmits the INFE signal to state machine 71 to indicate that input FIFO pair 1 is empty. Input FIFO empty block 84 and input FIFO full block 86 are conventional counter blocks.

Additionally, as shown in FIG. 14, blocks 90–96 generate the OUTFE and OUTFF signals. Output FIFO write counter 90 receives RSTROBE signal 544 from state machine 71. Output FIFO write counter 90 is a 2-bit counter that is incremented each time a data value is written into either output FIFO 41 or output FIFO 45 (i.e., at each rising edge of RSTROBE 544 signal). The output of output FIFO write counter 90 is provided to output FIFO empty block 94 and output FIFO full block 96.

Output FIFO read counter 92 receives output FIFO read enable signal 307a on lead 27a. Output FIFO read counter 92 is a 2-bit counter that is incremented each time a data value is read from output FIFO 41 or output FIFO 45 (i.e. at each rising edge of output FIFO read enable signal 307a). The output of output FIFO read counter 92 is provided to output FIFO empty block 94 and output FIFO full block 96. By comparing the number of read and write operations performed within output FIFOs 41 and 45, the output FIFO empty block 94 and output FIFO full block 96 determine whether the output FIFOs 41 and 45 are both empty or both full, respectively. If there are no data values stored in either output FIFO 41 or output FIFO 45, output FIFO empty block 94 transmits the OUTFE signal to state machine 71 to indicate that output FIFO pair 31 is empty. If both output FIFO 41 and output FIFO 45 contain a data value, output FIFO full block 96 transmits the OUTFF signal to state machine 71 to indicate that output FIFO pair 31 is full. Output FIFO empty block 94 and output FIFO full block 96 are conventional counter blocks.

State machine 71 receives the SRAME signal from SRAM empty block 69 (FIG. 14). To generate the SRAME signal, SRAM empty block 69 receives the 14-bit outputs from SRAM write counter 67 and SRAM read counter 65. As previously discussed, the 14-bit output of SRAM write counter 67 is representative of the number of write operations performed within SRAM FIFO 63 and the 14-bit output of SRAM read counter 65 is representative of the number of read operations performed within SRAM FIFO 63. Therefore, when the 14-bit output of SRAM write counter 67 is equal to the 14-bit output of SRAM read counter 65, an equal number of read and write operations have been performed within SRAM FIFO 63 (i.e., SRAM FIFO 63 is empty). When this condition exists, SRAM empty block 69 generates the SRAME signal to indicate this condition.

The other two inputs to state machine 71 are the FS signal and the INCLK signal. The one bit FS signal is provided by the user to enable multiplexer 26 (FIG. 1) to pass either WCLK signal 201 from write clock 9 (FS=1) or RCLK signal 301 from read clock 30 (FS=0) to state machine 71 as INCLK signal 501. The FS signal is used to select the faster of WCLK signal 201 and RCLK signal 301 for use as INCLK signal 501. The FS signal and INCLK signal 501 are common to SRAM memory blocks 21–24.

Figure 17:
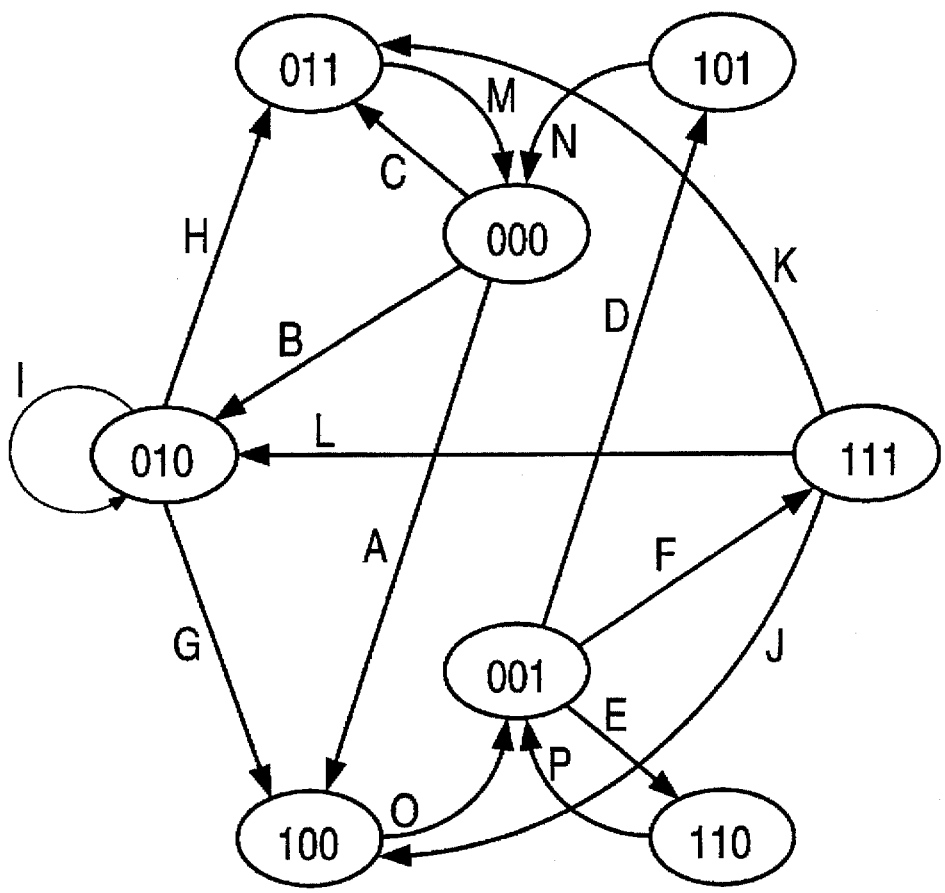
FIG. 17 is a state diagram which corresponds to the state table shown in Table 1.

In response to the previously described input signals, state machine 71 controls the flow of data values through SRAM FIFO 63 by controlling the order of read and write operations within SRAM FIFO 63. To transfer a stream of data values through the SRAM FIFO 63 without causing input FIFO pair 1 or output FIFO pair 31 to overflow, it is sometimes necessary to implement an operating sequence other than simply alternating the read and write operations within SRAM FIFO 63. This is especially true when WCLK signal 201 and RCLK signal 301 have different frequencies. State machine 71 generates its output signals to create an operating sequence which prevents input FIFO pair 1 and output FIFO pair 31 from overflowing. This operating sequence is illustrated in Table 1, which sets forth the state table implemented by state machine 71. Similar state machines in SRAM memory blocks 22–24 prevent input FIFO pairs 2–4 and output FIFO pairs 32–34 from overflowing. FIG. 17 is a state diagram which corresponds to the state table shown in Table 1. FIG. 18a is a block diagram of one embodiment of state machine 71. FIG. 18b is a table illustrating the boolean functions performed by the blocks of FIG. 18a.

TABLE 1

| present state | INPUTS | | | | | | OUTPUTS | | | | | next State | I/O ST |
|---|---|---|---|---|---|---|---|---|---|---|---|---|---|
| | FS | INFE | INFF | SEMPTY | OUTFE | OUTFF | SRAM WCLK | WREQ RCLK | SRAM RREQ | RSTROBE | | | |
| 000 | x | 0 | 0 | x | x | 0 | 0 | 0 | 1 | 1 | 0 | 100 | WA |
| | 0 | 0 | 0 | x | x | 1 | 0 | 0 | 0 | 0 | 0 | 010 | WB |
| | 1 | 0 | 0 | x | x | 1 | 1 | 1 | 0 | 0 | 0 | 011 | WC |
| | x | 0 | 1 | x | 0 | x | 1 | 1 | 0 | 0 | 0 | 011 | WD |
| | x | 0 | 1 | x | 1 | 0 | 0 | 0 | 1 | 1 | 0 | 100 | WE |
| | x | 0 | 1 | x | 1 | 1 | 1 | 1 | 0 | 0 | 0 | 011 | WF |
| | x | 1 | x | x | x | x | 0 | 0 | 1 | 1 | 0 | 100 | WG |

TABLE 1-continued

| present state | INPUTS | | | | | | OUTPUTS | | | | next State | I/O ST |
|---|---|---|---|---|---|---|---|---|---|---|---|---|
| | FS | INFE | INFF | SEMPTY | OUTFE | OUTFF | SRAM WCLK | WREQ RCLK | SRAM RREQ | RSTROBE | | |
| | x | 1 | x | x | x | 1 | 0 | 0 | 0 | 0 | 010 | WH |
| 001 | x | 0 | 0 | 0 | 0 | x | 1 | 1 | 0 | 1 | 101 | RA |
| | x | 0 | x | 0 | 1 | 0 | 0 | 0 | 1 | 1 | 110 | RB |
| | x | 0 | x | 0 | 1 | 1 | 1 | 1 | 0 | 1 | 101 | RC |
| | x | 0 | x | 1 | x | x | 1 | 1 | 0 | 1 | 101 | RD |
| | x | 0 | 1 | 0 | 0 | x | 1 | 1 | 0 | 1 | 101 | RE |
| | x | 1 | x | 0 | 0 | x | 0 | 0 | 0 | 1 | 111 | RF |
| | x | 1 | x | 0 | 1 | 0 | 0 | 0 | 1 | 1 | 110 | RG |
| | x | 1 | x | 0 | 1 | 1 | 0 | 0 | 0 | 1 | 111 | RH |
| | x | 1 | x | 1 | x | x | 0 | 0 | 0 | 1 | 111 | RI |
| 010 | 0 | 0 | 0 | 0 | 0 | 0 | 0 | 0 | 1 | 1 | 0 | 100 | NRA |
| 111 | 1 | 0 | 0 | 0 | 0 | 0 | 1 | 1 | 0 | 0 | 0 | 011 | NRB |
| | x | 0 | 0 | 0 | 0 | 1 | 1 | 1 | 0 | 0 | 0 | 011 | NRC |
| | x | 0 | x | 0 | 1 | 0 | 0 | 0 | 1 | 1 | 0 | 100 | NRD |
| | x | 0 | x | 0 | 1 | 1 | 1 | 1 | 0 | 0 | 0 | 011 | NRE |
| | x | 0 | x | 1 | x | x | 1 | 1 | 0 | 0 | 0 | 011 | NRF |
| | x | 0 | 1 | 0 | 0 | x | 1 | 1 | 0 | 0 | 0 | 011 | NRG |
| | x | 1 | x | 0 | x | 0 | 0 | 0 | 1 | 1 | 0 | 100 | NRH |
| | x | 1 | x | 0 | x | 1 | 0 | 0 | 0 | 0 | 0 | 010 | NRI |
| | x | 1 | x | 1 | x | x | 0 | 0 | 0 | 0 | 0 | 010 | NRJ |
| 011 101 | x | x | x | x | x | x | 0 | 1 | 0 | 0 | 0 | 000 | SW |
| 100 110 | x | x | x | x | x | x | 0 | 0 | 0 | 1 | 0 | 001 | SR |

The general rules followed by the state machine 71 to arbitrate the write and read operations of the SRAM FIFO 63 include the following. If input FIFO pair 1 is neither empty nor full, SRAM FIFO 63 is not empty, and output FIFO pair 31 is not full, state machine 71 alternately generates signals to perform write and read operations within SRAM FIFO 63. However, if the previously described conditions exist immediately after a cycle in which state machine 71 was inactive (i.e., in the 010 state of Table 1), a write operation is performed if the write clock 9 is faster than the read clock 30 (FS=1), and a read operation is performed if the read clock 30 is faster than the write clock 9 (FS=0).

If input FIFO pair 1 is empty, SRAM FIFO 63 is not empty, and output FIFO pair 31 is not full, state machine 71 generates signals to perform a read operation from SRAM FIFO 63. A write operation cannot be performed under these conditions because the input FIFO pair 1 is empty. Consequently, there are no data values available to be written into SRAM FIFO 63.

If input FIFO pair 1 is not empty or is full and output FIFO pair 31 is full, state machine 71 performs a write operation into SRAM FIFO 63. A read operation cannot be performed under these conditions because the output FIFO pair 31 is full. Consequently, there is no place to store data values read from SRAM FIFO 63.

If input FIFO pair 1 is empty and SRAM FIFO 63 is empty, state machine 71 does nothing for one cycle. A write operation cannot be performed under these conditions because input FIFO pair 1 is empty. As a result, there are no data values available to be written into SRAM FIFO 63. In addition, a read operation cannot be performed under these conditions because SRAM FIFO 63 is empty. Thus, there are no data values available to be read out of SRAM FIFO 63.

If input FIFO pair 1 is empty and output FIFO pair 31 is full, the state machine 71 does nothing for one cycle. Since input FIFO pair 1 is empty, there are no data values available to be written into SRAM FIFO 63. Since output FIFO pair 31 is full, there is no place available to store data values read from SRAM FIFO 63.

If input FIFO pair 1 is neither empty nor full and the output FIFO pair 31 is full, a write operation has just been performed, and the read clock 30 is faster than the write clock 9 (FS=0), state machine 71 does nothing for one cycle. This is because under these conditions, the next active cycle of state machine 71 will include another write operation (because both output FIFOs are full). By doing nothing for one cycle, state machine 71 provides a short period of time between consecutive write operations. This time allows the slower write clock 9 to "catch up" in the writing of data values into input FIFO pair 1.

If after a read operation, output FIFO pair 31 is neither empty nor full, input FIFO pair 1 is empty and SRAM FIFO 63 is not empty, state machine 71 does nothing for one cycle. This dead cycle ensures that state machine 71 detects any output FIFO full signals which are generated as a result of the prior read operation. After the dead cycle, state machine 71 continues operation in accordance with the previously described rules.

The rules set forth above allow at least 20 nanoseconds between read and write operations within SRAM FIFO 63 when the faster of the read clock 30 and the write clock 9 has a frequency of 100 Mhz.

The present invention is capable of transferring a 100 Mhz input data stream to output port 50 as a 100 Mhz output data stream. Thus, the present invention transfers data at a much higher frequency than is possible with any of the individual SRAM memory blocks 21–24. It is noted that only one operation (read or write) is performed at any given time within any of the individual single port SRAM memory block 21–24. However, the present invention allows multiple read and write operations to be performed simultaneously in different SRAM memory blocks 21–24. For example, a read operation can be performed in SRAM memory block 21 at the same time that a write (or read) operation is performed in SRAM memory block 22.

The present invention also includes a retransmit function. The retransmit function allows a series of data values to be retransmitted from SRAM memory blocks 21–24 to output FIFO pairs 31–34. FIGS. 19–22 are schematic diagrams illustrating circuitry used to initiate a retransmit function.

Figure 19:
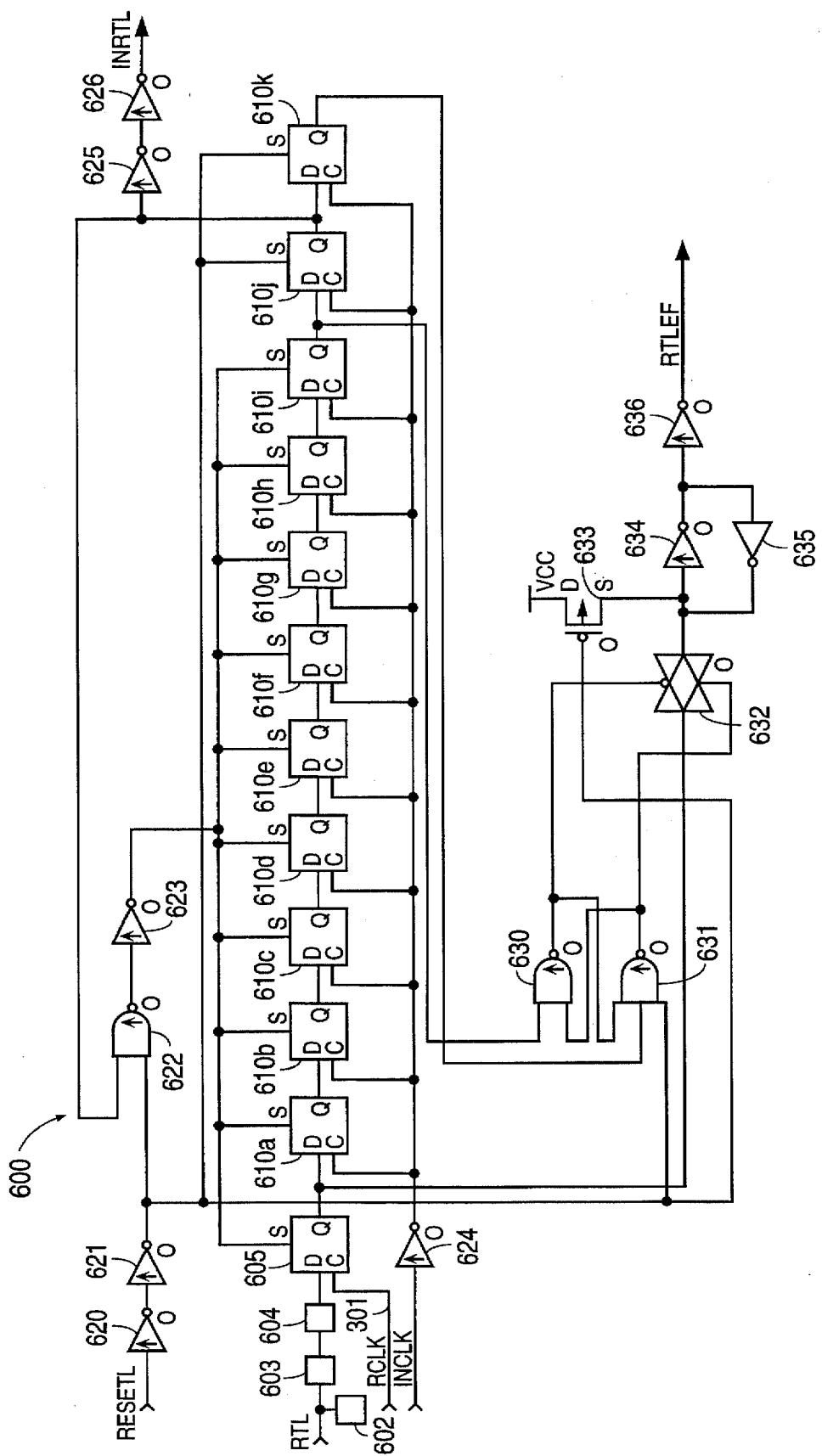
FIG. 19 is a logic diagram of a retransmit buffer block.

The retransmit function is initiated by a retransmit (RTL) signal which is generated by an external device (e.g., the device coupled to input port 100 or the device coupled to output port 50). The RTL signal is provided to a retransmit buffer (RTBUF) 600 (FIG. 19). Other inputs to the RTBUF block 600 include a master reset signal (RESETL), the RCLK signal 301, and the INCLK signal. The RESETL signal is a normally high signal which remains high during a retransmit function. As previously discussed, the INCLK signal is the faster of RCLK signal 301 and WCLK signal 201.

In response to the previously described inputs, RTBUF block 600 generates an internal retransmit (INRTL) signal and a retransmit empty flag (RTLEF) signal. The INRTL signal is provided to SRAM memory blocks 21–24 and output FIFO pairs 31–34. The RTLEF signal is used to generate an empty flag (EFL) signal which prevents data values from being read from output port 50.

Figure 20A:
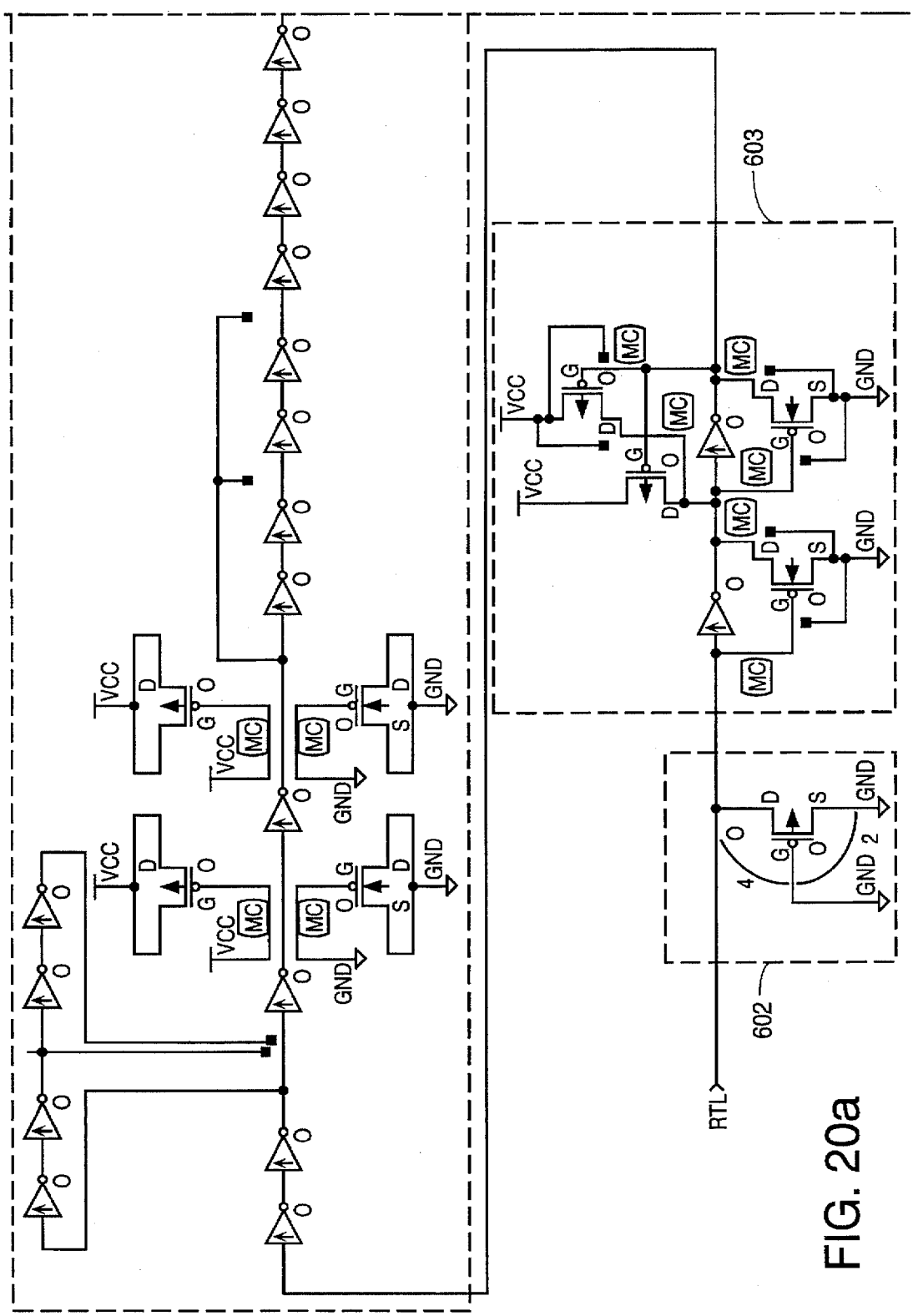
FIG. 20 is a schematic diagram of one embodiment of an ESD device, a level shifter and a delay block used in the retransmit buffer block of FIG. 19.
Figure 20B:
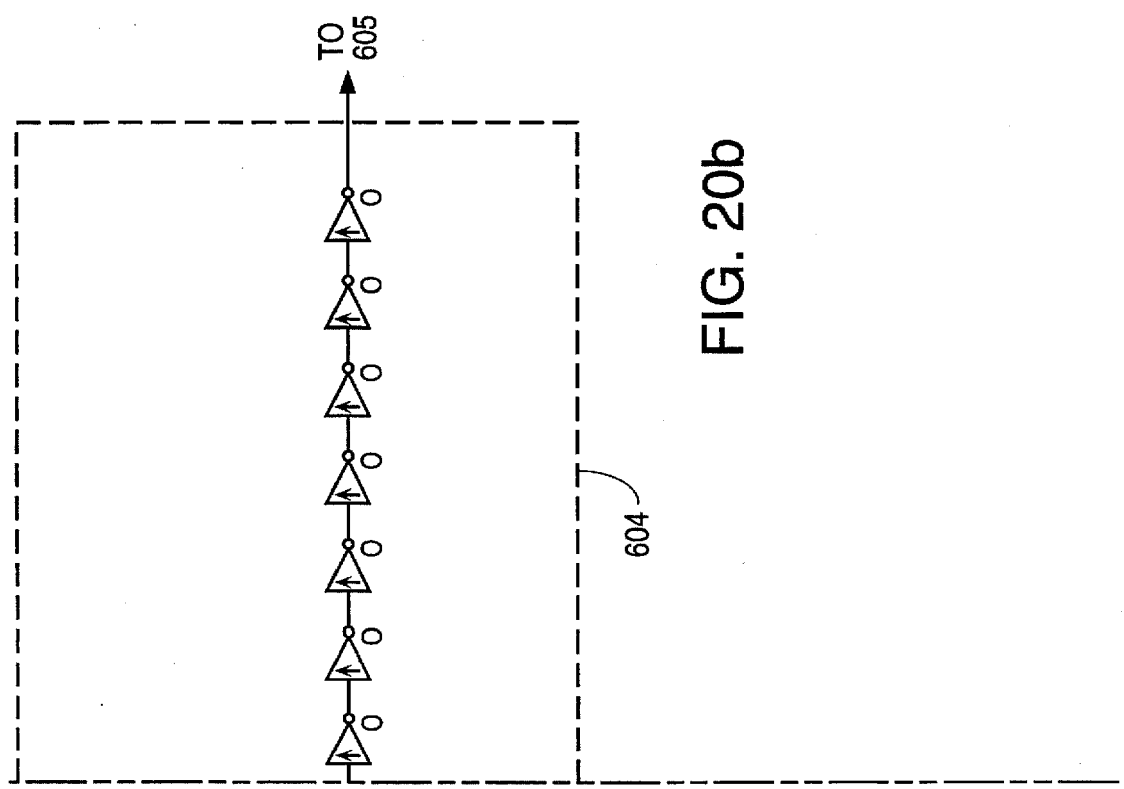

FIG. 19 is a logic diagram of retransmit buffer (RTBUF) block 600. The RTL signal is routed through electrostatic discharge (ESD) device 602, level shifter 603 and delay block 604 to register 605. FIG. 20 is a schematic diagram of one embodiment of ESD device 602, level shifter 603 and delay block 604. Delay block 604 inverts the RTL signal such that the inverse of the RTL signal is provided to the D input of register 605. Circuitry within register 605 is described in more detail later.

RCLK signal 301 is provided to the clock (C) input of register 605. In this manner, the retransmit function is synchronized to RCLK signal 301. The Q output of register 605 is connected to the D input of register 610a and the input of transmission gate 632. The INCLK signal is inverted by inverter 624 and provided to the clock (C) input of register 610a. Circuitry of register 610a, which is described in more detail later, is repeated for each of registers 610b–610k. The output of register 610a is daisy chained through the D inputs and Q outputs of registers 610b–610k. The inverted INCLK signal is also provided to the clock (C) inputs of registers 610b–610k.

The output of register 610j is amplified by inverters 625–626 to create the INRTL signal. The output of register 610j is also transmitted to one input of NAND gate 622. The other input of NAND gate 622 is the RESETL signal, which is amplified by inverters 620 and 621. The output of NAND gate 622 is inverted by inverter 623 and provided to the set (S) inputs of register 605 and registers 610a–610i. The set (S) inputs of registers 610j and 610k are connected to receive to the RESETL signal through inverters 620 and 621.

The Q output of register 605 is also provided to the input of transmission gate 632. Transmission gate 632 is controlled by the outputs of NAND gates 630 and 631. NAND gate 630 receives a first input from the Q output of register 610i and second input from the output of NAND gate 631. NAND gate 631 receives a first input from the RESETL signal (through inverters 620 and 621), a second input from the Q output of register 610k and a third input from the output of NAND gate 630. The output of transmission gate 632 is routed through inverters 634 and 636 to create the RTLEF signal. Inverter 635 provides a feedback loop for inverter 634. The output of transmission gate 632 is also connected to the source of p-channel field-effect transistor 633. The drain of transistor 633 is connected to a Vcc voltage source and the gate of transistor 633 receives the RESETL signal through inverters 620 and 621. Because the RESETL signal is normally high, transistor 633 is normally off during a retransmit function.

During normal operating conditions, the RTL, RESETL, RTLEF and INRTL signals are all high. Under these conditions, the input FIFO pairs 1–4, SRAM memory blocks 21–24 and output FIFO pairs 41–44 operate as previously described.

Figure 23:
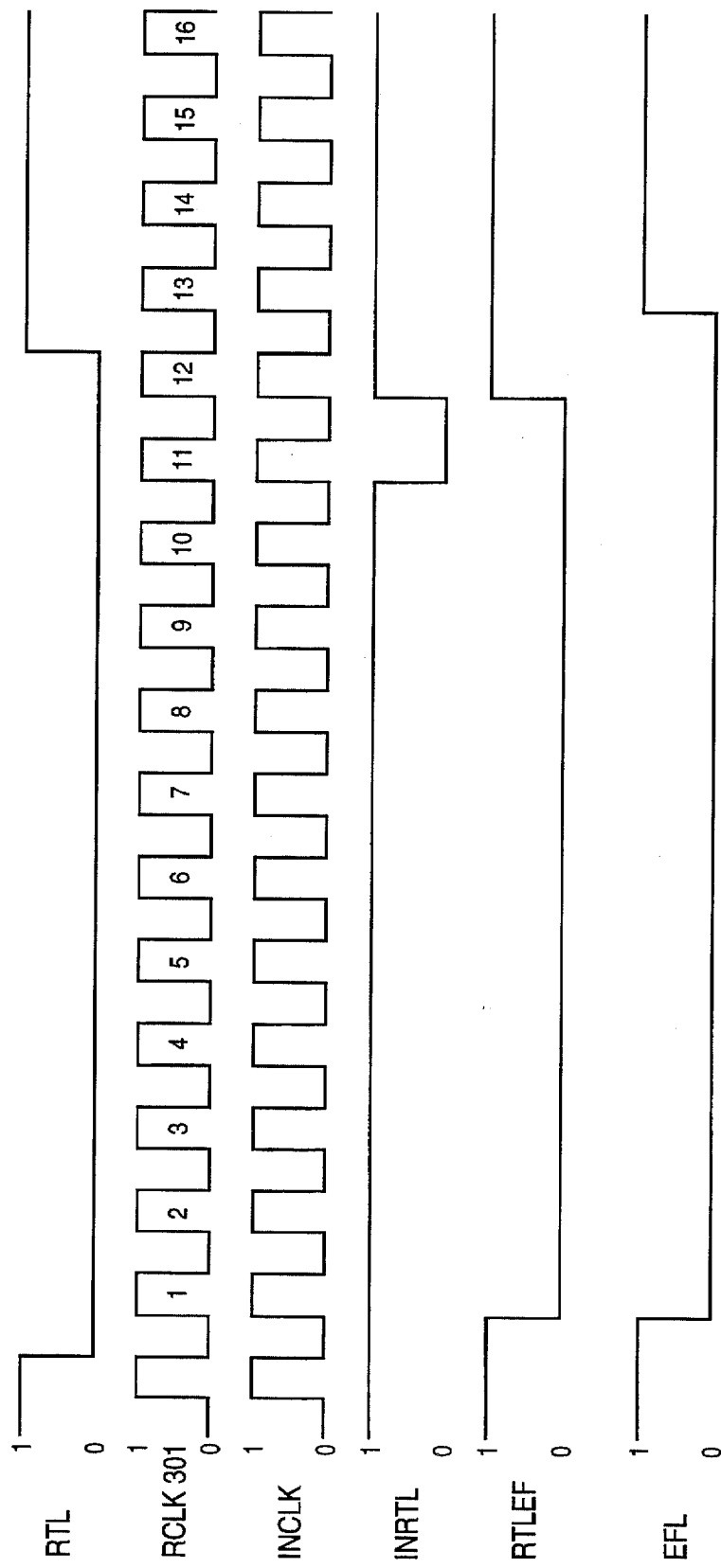
FIG. 23 is a waveform diagram illustrating various signals which exist during a retransmit operation.

To initiate a retransmit function, the RTL signal is asserted low. FIG. 23 is a waveform diagram illustrating various signals which exist during a retransmit operation. In FIG. 23, it is assumed that the INCLK signal is the same as the RCLK signal 301 (i.e., RCLK signal 301 is faster than WCLK signal 201). The low value of the RTL signal is transmitted through ESD device 602 and level shifter 604 and is inverted by delay block 604, resulting in a high D input to register 605.

Figure 21:
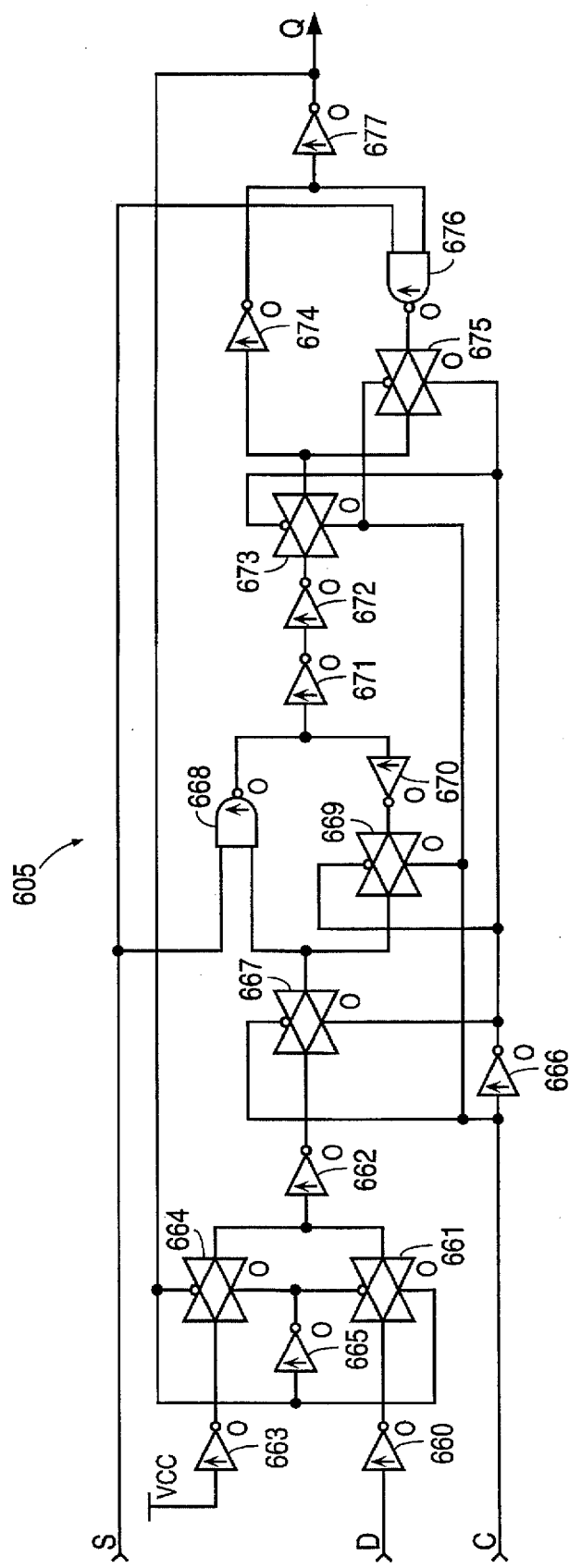
FIG. 21 is a logic diagram illustrating circuitry within a register of the retransmit buffer block of FIG. 19.

FIG. 21 is a logic diagram illustrating circuitry within register 605. When RCLK signal 301 is in a low state, transmission gates 661, 667 and 675 of register 605 are open and transmission gates 664, 669 and 673 of register 605 are closed. The S input of register 605 is initially in a high state. Consequently, the high D input to register 605 is transmitted through inverter 660, transmission gate 661, inverter 662, transmission gate 667, NAND gate 668 and inverters 671–672 during the low state of RCLK signal 301. On the rising edge of RCLK signal 301, transmission gates 661, 667 and 675 close and transmission gates 664, 669 and 673 close. During these conditions, the output of inverter 672 is transmitted through transmission gate 673, inverter 674 and inverter 677 to the Q output of register 605. The resulting Q output of register 605 is low.

The low Q output of register 605 is transmitted through transmission gate 632 and inverters 634–636, resulting in a low RTLEF signal.

Figure 22:
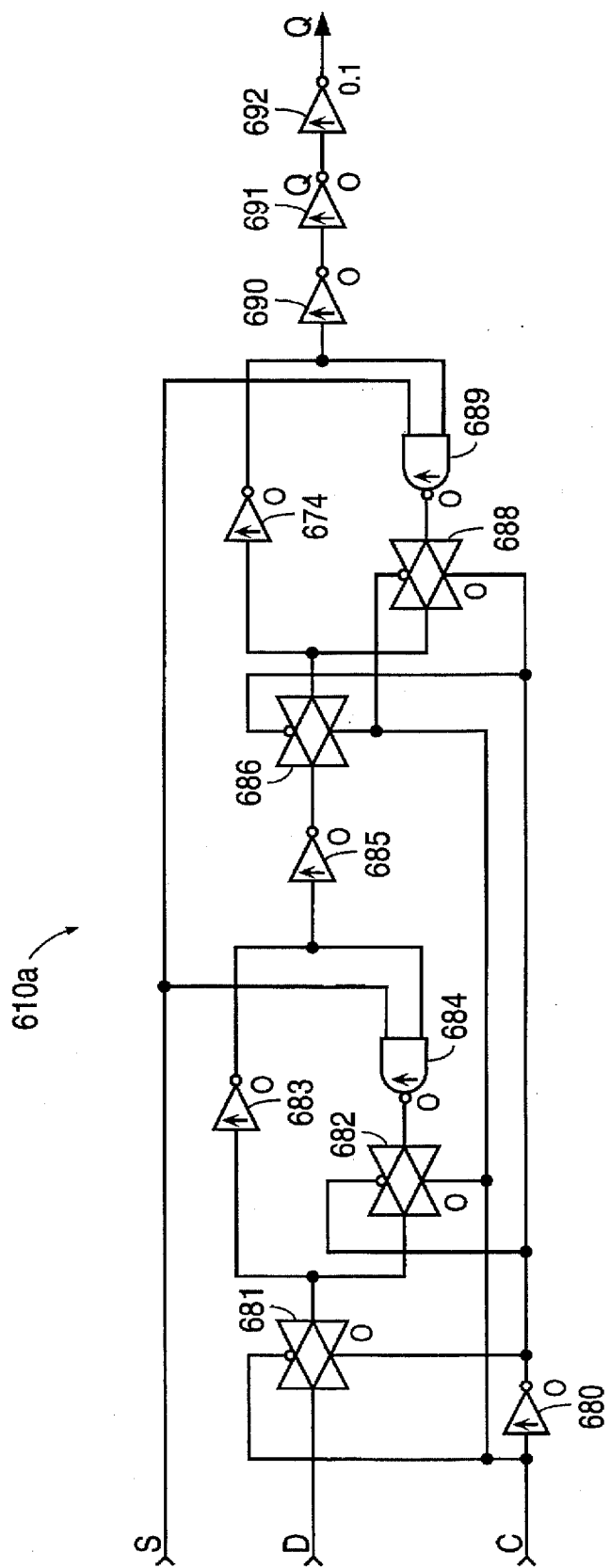
FIG. 22 is a logic diagram of circuitry within another register of the retransmit buffer block of FIG. 19.

The low Q output of register 605 is also provided to the D input of register 610a. FIG. 22 is a logic diagram of circuitry within register 610a (and registers 610b–610k). The S input to register 610a is initially high. When the C input to register 610a is in a low state (i.e., when the INCLK signal is high), transmission gates 681 and 688 are open and transmission gates 682 and 686 are closed. Consequently, the low D input of register 610a is transmitted through transmission gate 681, inverter 683 and inverter 685. During the next rising edge of the C input to register 610a (i.e., the next falling edge of the INRTL signal), transmission gates 681 and 688 are closed and transmission gates 682 and 686 are open. As a result, the output of inverter 685 is transmitted through transmission gate 686, inverter 687 and inverters 690–692. Thus, a logic low signal is transmitted to the Q output of register 610a. Register 610a introduces a one cycle delay into the propagation of the logic low signal.

The low Q output of register 610a is transmitted to the D input of register 610b. After a delay of one cycle of the INCLK signal, the Q output of register 610b transitions to a low state. This sequence is continued until the Q output of register 610i transitions to a logic low state, nine cycles after the RTL signal is detected by register 605. The low Q output of register 610i is transmitted to the first input of NAND gate 630, thereby toggling the outputs of NAND gates 630 and 631 and opening transmission gate 632. While transmission gate 632 is open, the RTLEF signal remains low because the latch formed by inverters 634 and 635 retains the previous output of transmission gate 632.

Ten cycles after the RTL signal is detected by register 605, the Q output of register 610j transitions to a low state. The low Q output of register 610j is transmitted through inverters 625 and 626, resulting in a logic low INRTL signal. The low Q output of register 610j is also transmitted to an input of NAND gate 622. Because the other signal input to NAND gate 622 is a logic high signal (RESETL=1), a logic low signal is transmitted to the S inputs of register 605 and registers 610a—610i, thereby resetting these registers such that each of these registers has a high Q output. The high Q output of register 610i does not cause the outputs of NAND gates 630 and 631 to toggle. Consequently, transmission gate 632 remains open.

Eleven cycles after the RTL signal is detected by register 605, the Q output of register 610j returns to a high state (because of the logic high input from register 610i) and the Q output of register 610k transitions to a low state (because of the logic low input from register 610j). Consequently, the INRTL signal transitions to a high state. In addition, the low output of register 610k causes transmission gate 632 to open. As a result, the high Q output of register 605 is transmitted through transmission gate 632, causing the RTLEF signal to return to a logic high state eleven cycles after the RTL signal is detected by register 605.

Twelve cycles after the RTL signal is detected by register 605, the Q output of register 610k transitions to a high state, returning the RTBUF block 600 to its original state (assuming there are no further retransmit signals).

Because the high Q output of register 610j resets registers 605 and 610a–610j nine cycles after the RTL signal is detected by register 605, any additional RTL signal received within nine clock cycles of the original RTL signal will be ignored (i.e., it will be "erased" during the resetting of registers 605 and 610a–610j).

The RTLEF signal is used to generate an empty flag (EFL) signal (FIG. 23). The EFL signal goes low at the same time the RTLEF signal goes low. The EFL signal remains low for twelve cycles and is provided to a write enable pin of the output device which receives data values from output port 50. The low EFL signal thereby prevents this output device from receiving any data values from output port 50 during this twelve cycle time period (even if there are data values stored in output FIFO pairs 31–34). After twelve cycles, the EFL signal transitions back to its original (high) state and normal operation continues.

When an input device coupled to input port 100 requests a retransmit operation by asserting the RTL signal low, this input device stops providing data values to input port 100 for a period of 14 clock cycles of the faster of the read clock signal 301 and the write clock signal 201 or until the EFL signal transitions to a high state.

During the first ten cycles after the RTLEF signal transitions to a low state, the state machines in SRAM memory blocks 21–24 continue normal operation. During these ten cycles, any data values stored in input FIFO pairs 1–4 are written to their respective SRAM memory blocks 21–24, and data values are read from SRAM memory blocks 21–24 to their respective output FIFO pairs 31–34. At the end of this ten cycle period, input FIFO pairs 1–4 are empty, SRAM memory blocks 21–24 are not empty and output FIFO pairs 31–34 are full (although not with the data values to be retransmitted). Thus, the state machines are in state 010 (See Table 1) at the end of these ten cycles. If the state machines reach state 010 before the end of ten cycles, the state machines will simply "idle" in this state, performing neither read nor write operations.

As previously discussed, the INRTL signal goes low eleven cycles after the RTLEF signal goes low. The INRTL signal is transmitted to the output FIFO pairs 31–34 and to the following elements in the SRAM memory blocks: SRAM read counter 65, SRAM empty block 69, output FIFO write counter 90, output FIFO read counter 92, output FIFO empty block 94, and output FIFO full block 96.

The low INRTL signal resets the address of SRAM read counter 65 to zero, such that subsequent read operations from SRAM FIFO 63 proceed from the initial address of the SRAM FIFO 63. The low INRTL signal also resets output FIFO write counter 90 and output FIFO read counter 92 to zero, thereby initializing these counters. In addition, the low INRTL signal resets the output of output FIFO full block 96 to zero and the output of output FIFO empty block 94 to a logic high state, thereby indicating to the state machines within SRAM memory blocks 21–24 that the output FIFO pairs 31–34 are not full and empty, respectively. Furthermore, the low INRTL signal is provided to the RESETL input of output FIFO pairs 31–34 (See, e.g., FIG. 9), thereby erasing the data values previously stored in output FIFO pairs 31–34. The low INRTL signal also causes SRAM empty block 69 to generate a logic high output signal, thereby artificially indicating that SRAM FIFO 63 is empty. The low INRTL signal also causes the low EFL signal to transition to a logic high state after a two clock cycle delay, thereby enabling the output device coupled to output port 50 to receive data values from SRAM memory blocks 21–24.

After the above described conditions are established, the INRTL signal transitions back to a logic high state (after the eleventh cycle) and the state machine returns to normal operation. Given the initial conditions described above, the state machines in SRAM memory blocks 21–24 will cause data values to be read from the initial address positions of SRAM memory blocks 21–24 to their respective output FIFO pairs 31–34 during the twelfth cycle. At the end of the twelfth cycle, the EFL signal transitions from low to high, thereby allowing the data values to be written to input port 100 and read from output port 50. If no additional data values are provided to input port 100, data values are read from SRAM memory blocks 21–24 until these blocks are empty. If additional data values are written to input FIFO pairs 1–4, the state machines continue to operate following the previously described rules for normal operation.

If the RTL signal does not go high before the beginning of the twelfth clock cycle, another retransmit operation will be performed.

While the present invention has been described above with respect to a single embodiment, the invention is capable of numerous rearrangements and modifications which would be apparent to one of ordinary skill in the art. For example, the SRAM memory blocks are not limited to the use of single port SRAM memory cells. Single port DRAM memory cells may also be used. Furthermore, the invention is not limited to a particular number of SRAM memory blocks, input FIFOs and/or output FIFOs. Any number of SRAM memory blocks and input and output FIFOs may be used as long as there are at least two input FIFOs and two output FIFOs coupled to each SRAM memory block. In addition, the present invention is not limited to the particular state machine disclosed. Variations on this state machine could be implemented by one of ordinary skill in the art. Accordingly, it is intended that the present invention be limited only by the claims set forth below.

What is claimed is:

1. A method for retransmitting data values from a synchronous first in, first out (FIFO) memory device having an input port coupled to provide data values to an input FIFO, a single port memory coupled to receive data values from said input FIFO, an output FIFO coupled to receive data values from said single port memory, and an output port coupled to receive data values from said output FIFO, said method comprising the steps of:

preventing data values from being written to said input FIFO for a first predetermined time period;

preventing data values from being read from said output port for said first predetermined time period;

resetting a read address counter associated with said single port memory to an address representative of an initial address position within said single port memory;

clearing said output FIFO; and then sequentially reading data values from said single port memory to said output FIFO beginning at said initial address position of said single port memory; and allowing data values to be read from said output port.

2. The method of claim 1, further comprising the step of initiating the method in response to a first retransmit signal.

3. The method of claim 2, further comprising the step of preventing said FIFO memory device from operating in response to a second retransmit signal for a second predetermined period after the first retransmit signal is received.

4. The method of claim 1, further comprising the step of, reading data values stored in said input FIFO to said single port memory during said first predetermined time period.

5. The method of claim 1, further comprising the step of initializing a state machine which controls said single port memory before the step of sequentially reading data values from said single port memory.

6. The method of claim 5, further comprising the steps of:

resetting a write counter associated with the output FIFO; and resetting a read counter associated with the input FIFO.

7. The method of claim 5, further comprising the step of setting a signal to indicate that said output FIFO is empty.

8. The method of claim 5, further comprising the step of setting a signal to indicate that said single port memory is empty.

9. The method of claim 5, further comprising the step of allowing data values to be written to said input port after the step of sequentially reading data values from said single port memory.

* * * * *